Figure 1:
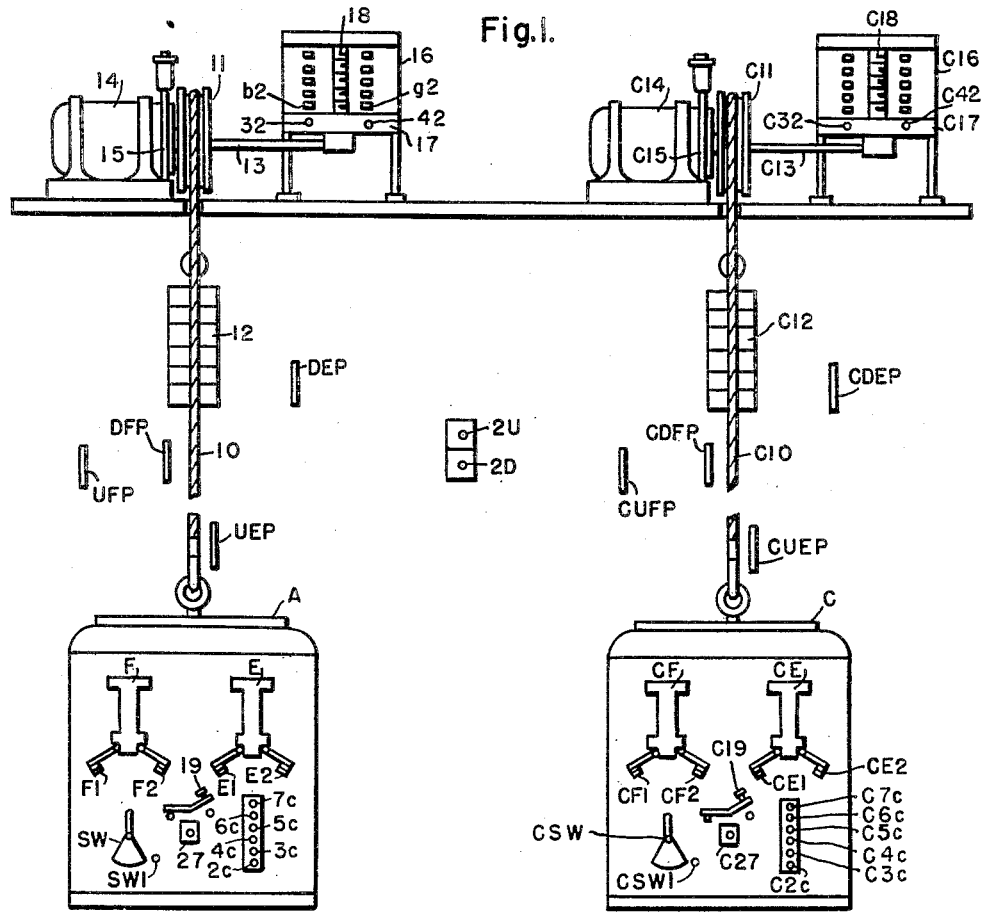

Nov. 20, 1951  D. SANTINI ET AL  2,575,732
ZONED ELEVATOR SYSTEM

Filed June 23, 1949  9 Sheets-Sheet 1

WITNESSES:

INVENTORS
Danilo Santini, Arvid M. Nelson
and John Suozzo.
BY
ATTORNEY

INVENTORS
Danilo Santini, Arvid M. Nelson and John Suozzo.
ATTORNEY

Nov. 20, 1951 D. SANTINI ET AL 2,575,732
ZONED ELEVATOR SYSTEM
Filed June 23, 1949 9 Sheets-Sheet 9

WITNESSES:

INVENTORS
Danilo Santini, Arvid M. Nelson
and John Suozzo.
BY
ATTORNEY

Patented Nov. 20, 1951

2,575,732

UNITED STATES PATENT OFFICE 2,575,732

ZONED ELEVATOR SYSTEM

Danilo Santini, Tenafly, Arvid M. Nelson, Hillsdale, and John Suozzo, North Arlington, N. J., assignors to Westinghouse Electric Corporation, East Pittsburgh, Pa., a corporation of Pennsylvania Application June 23, 1949, Serial No. 100,924

37 Claims. (Cl. 187—29)

This invention relates to a flexible elevator system and it has particular relation to an elevator system wherein the floors served by the system are divided into a low zone and a high zone. The elevators of the system are divided into a low zone group for providing preferred service for the low zone floors and a high zone group for providing a preferred service for the high zone floors under predetermined conditions. The invention is directed especially to a system of the aforesaid type wherein special service is given to floor calls which have been registered for an undesirably long period of time.

In discussing an elevator system, it is convenient to designate one floor as a reference or parking floor. If the elevator system is associated with a large ship, the reference or parking floor may be the upper terminal such as the main or upper deck of the ship. As a further example, if the elevator system is designed to serve an underground structure such as a mine, the reference or parking floor again may be an upper terminal which in this case would be the ground terminal. However, for the purpose of discussion, it will be assumed that the elevator system is installed in an office building wherein the reference or parking floor is the lower terminal or ground floor of the building. For examples of prior art elevator systems, reference may be made to Patents 2,376,113, 2,376,218 and 2,447,935.

For the purpose of facilitating an understanding of the invention, it will be helpful to set forth briefly a typical example of the service provided by an elevator system embodying the invention. If the system is installed in an office building, the traffic handled by the elevator system is predominantly in an up direction during certain periods. For example, immediately before the start of a business day most passengers travel from the reference or parking floor to various floors of the building and most of the stops of each elevator car are made in response to car calls. Under these circumstances, the traffic can be handled most expeditiously by connecting the circuits controlling all of the elevator cars to dispatch the cars from the reference or parking floor when loaded or at regular intervals and for operating the cars "high call reversal."

When so conditioned, each car makes all stops in response to car calls and, on its way up, stops for all up floor calls. The car also is conditioned to reverse at the highest of the car or floor calls. When the car reverses at the highest call, it promptly receives a "start down" signal and returns immediately to the ground floor stopping for all down calls on the return. Such operation of an elevator car is well understood in the art.

During regular business hours, the elevator system must handle traffic in both directions in substantially equal volumes. To handle such traffic, the elevator system may be reconnected for what may be termed "off-peak" operation. When conditioned for off-peak operation, the cars make through trips between the upper and lower terminal floors and are dispatched successively from each terminal floor at regular intervals. A dispatcher may be provided which dispatches a car standing at either terminal floor as soon as another car arrives at that terminal floor. Conveniently, the dispatcher may be so designed that when two cars are located at the ground or lower terminal floor, the arrival at the ground floor of a third car may immediately dispatch one of the two cars already at the ground floor.

If desired, the elevator system may be so arranged that if no elevator car is at the upper terminal floor at the time the dispatcher interval has elapsed the elevator car nearest to the upper terminal floor stops at its highest down call or car call, whichever is higher, receives a "start down" signal, and immediately starts for the ground floor. Dispatching systems of the foregoing type are well known in the prior art. If there are no down calls above the car nearest to the upper terminal floor, the car may continue towards the upper terminal floor and may be dispatched immediately on arrival at the upper terminal floor.

When the traffic is predominantly in a down direction, the elevator system is reconnected for zone operation. Such traffic may occur, for example, immediately after the close of a business day. In a zone system, the floors of the office building are divided into a plurality of zones. For example, the floors may be divided into an upper zone and a lower zone at a plane which may be termed the "load center" or center of gravity of the traffic in the building. In addition, the elevators are divided into groups for giving preferred service to the respective zones. For the specific example given above, the elevators may be divided into a high zone or high rise group and a low zone or low rise group for giving preferred service respectively to the high zone and low zone floors. The number of elevator cars placed in each group is determined by the traffic requirements of the specific office building. Ordinarily, the number of cars to be placed in the low zone group should not exceed one-half the total number of elevator cars, plus one.

The cars selected for the high zone group may operate as follows:

A. They take all of the up traffic from the ground or reference floor and during their upward travel they answer all up floor or corridor calls and all car calls that may be registered between the terminals. These cars run to the upper terminal floor of the building.

B. When coming down, the high zone cars answer all the down calls between the upper terminal floor and the load center.

C. The high zone cars automatically by-pass all down calls below the load center.

D. The high zone cars are dispatched from the ground or reference floor at regular intervals and are dispatched from the upper terminal floor instantaneously on arrival.

E. If desired, the high zone cars may be operated "high call reversal."

The cars selected for the low zone group operate as follows:

A. They do not take any up traffic at the ground or reference floor and they automatically by-pass all of the up floor calls.

B. If at the time a low zone car leaves the ground or reference floor, there is a predetermined number or "quota" of down floor calls registered below the load center, the low zone car travels to the highest down call below the load center, reverses and is dispatched toward the ground or reference floor. During its return, it answers all low zone down floor calls.

C. If a second low zone car starts up before the first low zone car has travelled a predetermined distance after reversal in the down direction, the second low zone car reverses at the highest down call below the load center only if the number of down floor calls registered below the load center is greater than the number required for the first car. For example, the number of calls or "quota" required under these circumstances for the second car may be double the number required for the first car.

D. If a third car starts up from the reference floor before the first car has travelled the predetermined distance in the down direction, it does not reverse at the highest down floor call below the load center unless the number of down floor calls below the load center registered is still greater than the number required for the second car. For example, the number of registered down calls or "quota" for the third car may be three times that required for the first car. In other words, the quota for each car depends on the number of low zone cars which previously have been made available to pick up the registered down calls below the load center.

E. If when a low zone car starts up from the reference floor, there are insufficient down floor calls registered below the load center to equal or exceed the quota for the car, the car continues travelling above the load center to assist the high zone cars. Under these circumstances, the low zone car travels to the upper terminal floor and is dispatched towards the ground floor in a manner similar to that employed for the high zone cars. During its return to the ground floor, the low zone car answers all down floor calls, unless the down floor calls registered below the load center are sufficient to equal or exceed the quota for the car, whereupon the car by-passes the high zone down floor calls.

F. If a low zone car is travelling up above the load center when sufficient down floor calls below the load center are registered to satisfy the quota of the car, the car automatically reverses at the next down call or if no down call exists above the car, at the next floor, and is dispatched towards the ground floor. During its return, the low zone car by-passes all down floor calls above the load center and picks up all down floor calls below the load center.

G. Since the traffic is predominantly in the down direction, in order to give equal service to all of the floors, all of the cars in both the high and low zone groups are dispatched from the ground or reference floor at regular intervals. If the high zone cars operate on a through trip basis, they are dispatched from the upper terminal floor at regular predetermined intervals. If the low zone cars reverse before reaching the upper terminal floor, they are dispatched instantly. Should a low zone car reach the upper terminal floor, it is dispatched at the same interval provided for the high zone cars. In other words, when cars reach the upper terminal floor, the dispatcher does not discriminate between low zone and high zone cars.

In accordance with the invention, special service is given for floor calls which remain unanswered for an undesirably long period of time. Thus, if a floor call in the high zone remains unanswered for more than a predetermined time (such a call is designated a "priority" call) the first low zone car which starts from the reference floor with insufficient low zone calls to equal or exceed the quota for the car will be assigned to pick up the priority floor call.

If several priority down floor calls exist in the high zone when the low zone car starts, the car proceeds to the highest of the priority down calls and reverses. On the way down the car picks up only the priority down calls in the high zone and down calls existing below the load center.

In a similar manner, any down call in the low zone which has been registered for more than a predetermined time (here designated a "priority" call) will be picked up by the first descending unfilled high zone car or by a low zone car which is descending in the high zone without having its quota filled.

It is, therefore, an object of the invention to provide a zoned elevator system wherein a priority floor call in one zone, such as one which has been registered for more than a predetermined time, is given special service by an elevator car normally giving service predominantly to another zone.

It is also an object of the invention to provide a zoned elevator system wherein a high zone elevator car normally serving predominantly a high zone of floors, and a low zone elevator car normally serving predominantly a low zone of floors, each may be assigned, if available, to give special service to a priority floor call in a zone other than that predominantly served by the car so assigned.

It is a further object of the invention to provide a zoned elevator system wherein a high zone elevator car serves predominantly a high zone of floors and a low zone elevator car serves predominantly a low zone of floors and wherein an available low zone car may be assigned to give special service to a priority call in the high zone.

It is also an object of the invention to provide an elevator system as defined in the preceding paragraph wherein if several priority calls exist in the high zone, the available low zone car may be assigned to proceed upwardly to the highest of the priority calls, reverse and pick up said priority calls on the return thereof to the lower terminal or reference floor.

It is an additional object of the invention to provide an elevator system wherein a high zone elevator car serves predominantly a high zone of floors and a low zone elevator car serves predominantly a low zone of floors and wherein an available high zone car may be assigned to give special service to a priority call in the low zone.

It is a still further object of the invention to provide a zoned elevator system as defined in the preceding paragraph wherein if several priority calls exist in the low zone, the available high zone car may be assigned to pick up the priority calls successively.

Figure 2:
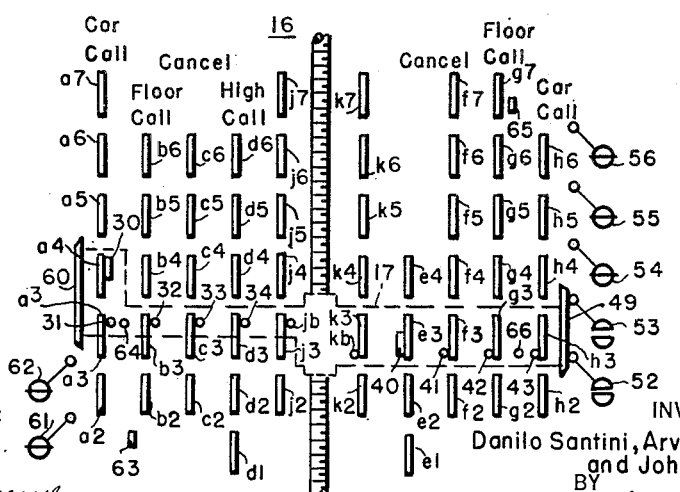

Other objects of our invention will become evident from the following detailed description taken in conjunction with the accompanying drawings, of which:

Figure 1 is a diagrammatic representation of an elevator system embodying our invention, Fig. 2 is a diagrammatic representation of the stationary contact segments and the moving brushes on a floor selector for one of the elevator cars embodied in Fig. 1, with the brushes disposed in the position they take when the car is stopped at the third floor.

Figs. 3, 4, 5 and 6 collectively constitute a diagrammatic representation in straight-line style of the circuit connections for the two-car elevator system illustrated in Fig. 1. The figures should be assembled vertically in numerical order with Fig. 3 at the top.

Figs. 3A to 6A, inclusive, are key representations of the relays in Figs. 3 to 6, inclusive, illustrating the coils and contact members disposed in horizontal alignment with their positions in the straight-line circuits of Figs. 3 to 6. Figs. 3A to 6A should be placed beside the corresponding Figs. 3 to 6 to facilitate the location of the various coils and contacts.

Each relay coil or winding is identified by a relay reference character. Each set of relay contacts is identified by the proper relay reference character followed by a number representing the set of contacts. The relay contacts may be "back" or "break" contacts which are designed to interrupt a circuit when a relay having such contacts is energized. A relay also may have "front" or "make" contacts which are designed to complete or close a circuit when the relay is energized.

The elevator system illustrated is provided with four cars A, B, C and D for serving seven floors. This number of cars and this number of floors have been selected for the purpose of simplifying the disclosure as much as possible, but it is to be understood that the invention may be used for any reasonable number of cars in a bank serving any reasonable number of floors. For example, the invention would be suitable for an installation of six cars serving thirty floors. Although the number of zones employed will depend on the specific elevator system design, the following description will portray a system having two zones.

For the sake of simplicity, the similar apparatus individual to each car is given the same reference characters except that the apparatus for cars B, C or D is given the prefix B, C or D to indicate that it is for cars B, C or D instead of for car A.

In the discussion which follows, cars A and B are assumed to be connected for low zone operation, and cars C and D are assumed to be connected for high zone operation. The drawings show primarily cars A and C together with their associated circuits. It will be understood that the circuits for cars B and D are substantially similar respectively to the circuits for the cars A and C.

*Apparatus individual to car A*

D—down switch.
E—slow-down inductor relay.
F—stopping inductor relay.
G—inductor holding relay.
H—high car call relay.
J—high call reversing relay.
K—high floor call relay.
KX—auxiliary high priority-floor-call relay.
L—shift relay.
M—car running relay.
P—inductor plates.
R—resistors.
S—floor call stopping relay.
SX—auxiliary floor call stopping relay.
T—car call stopping relay.
U—up direction switch.
V—high speed relay.
W—up direction preference relay.
X—down direction preference relay.
QM—quota modifying relay.
Z—limiting relay.
TR—transfer relay.
DR—door relay.
PA—manual by-pass relay.
PB—automatic by-pass relay.
PC—transfer control relay.
7DR, 6DR, 5DR, 4DR, 3DR, 2DR—down call-storing relays, common to all cars.
7DT, 6DT, 5DT, 4DT, 3DT, 2DT—down floor-call time-delay relays, common to all cars.
6UR, 5UR, 4UR, 3UR, 2UR—up call-storing relays, common to all cars.
PD—auxiliary transfer control relay common to all low zone cars.
PE—special service control relay common to all high zone cars.
Q—quota relay common to all low zone cars.
QA—quota auxiliary relay common to all low zone cars.
PF—special service control relay common to all low zone cars.

*Apparatus in Fig. 1 of the drawings*

Referring more particularly to Fig. 1 of the drawings, it will be observed that a car A is arranged to be supported in a hatchway by a cable 10 which passes over a sheave 11 to a counterweight 12. The sheave 11 is mounted for rotation by a shaft 13 driven by a motor 14. A brake 15 of the usual spring-operated, electromagnetically-released type is provided for stopping further rotation of the sheave 11 when the motor 14 is deenergized.

A floor selector 16, of any suitable type, is provided for connecting the various electrical circuits of the system in accordance with the position of car A. The shaft 13 is extended to operate a brush carriage 17 on the floor selector 16 by mechanically rotating a screw-threaded shaft 18 on which the carriage is mounted. The carriage 17 is provided with a number of brushes which are disposed upon movement of the car, to successively engage stationary contacts arranged in rows on the selector in position to correspond to the floors of the building. For simplicity, only two brushes, 32 and 42, and two rows of contact segments b2 and g2, etc., disposed to be engaged by them are illustrated in Fig. 1, but it will be understood that in the system to be described herein, as well as in practice, a much larger number of brushes and rows of contact segments is required. Other forms of selectors may be substituted for the selector shown, if desired.

A starting switch SW is mounted in the car to be operated by the attendant to start the car. When the car switch is rotated anticlockwise, it closes its contacts SW1 to start the car for the direction for which it is conditioned to operate. When the car switch is centered, it leaves the control system of the car in such condition that the car can be stopped by operation of hall buttons at the floor landings or stop buttons in the car. It is to be understood that the car may be operated by the car switch or that any suitable control means may be substituted for the car switch. The illustration of the car switch is used for simplicity in describing the system.

Car buttons 2c, etc. (one for each floor) are mounted in the car, so that the attendant may, by operating them, cause the car to stop automatically at any floor. The direction of operation of the car is controlled by relays W and X as will be described in the connection with Fig. 3.

Hall buttons are mounted at the floor landings, in order that waiting passengers may cause the cars to stop thereat. An up button and a down button are provided at each floor intermediate the terminals. A down button is disposed at the top terminal and an up button at the bottom terminal. Fig. 1 illustrates only the up hall call button 2U and the down hall call button 2D for the second floor.

In order to automatically effect accurate stopping of car A at the floors in response to operation of the stopping buttons 2c, etc., in the car, or by operation of the hall call buttons 2U, 2D, etc., at the floor, a slow-down inductor relay E and a stopping inductor relay F are mounted on the car in position to cooperate with suitable inductor plates of iron or other magnetic material, mounted in the hatchway adjacent to each floor. Only the up plates UEP and UFP and the down plates DEP and DFP for the second floor are illustrated. Similar plates are provided for each floor, except that the top terminal has only up plates and the bottom terminal only down plates.

The inductor relays E and F, when their coils are energized, have normally incomplete magnetic circuits which are successively completed by the inductor plates as the car approaches a floor at which a stop is to be made. These relays are so designed that energization of their operating coils will not produce operation of their contacts until each relay is brought opposite its inductor plate, thereby completing the relay magnetic circuit. Upon operation of the relay contacts (such as E1 or E2) they remain in operated condition until the relay operating coil is de-energized, even though the inductor relay moves away from the position opposite the inductor plate which completed its magnetic circuit. The plates should be so spaced in the hatchway as to provide desirable distances for slowdown and stopping of the cars at the floors. Other methods of controlling slowing down and stopping of the car may be used if so desired.

In the present system, which is given as an example of how the invention may be utilized, the various control circuits are so connected that the system will operate with a low zone or lower group of floors including the first, second, third and fourth floors and a high zone or high groups of floors including the fifth, sixth and seventh floors. Floor one is considered as the parking or reference floor. The division between the two zones of floors is determined by making certain wiring connections with a low zone circuit 51, as will be described later in connection with Fig. 5.

The cars and their control apparatus may be designed for operation, under certain conditions, as a high call reversal system in which the cars stop for up calls on their up trips but automatically stop and reverse at the highest down call when there is no service required above that highest down call. Such operation is well understood in the art. If the car attendant desires, for any reason, to go above the highest down call while on an up trip, he can do so by pressing a car call button, 6c, etc., for a floor above to cause the car to keep on up to such floor. However, at certain peak periods in down travel the system is adjusted or set to cause selected cars to serve down calls only in the lower floors when they exceed a predetermined number.

Suitable switching means, represented by the switch 19, may be provided on the cars or elsewhere to condition each elevator car to be dispatched at each terminal, or for operation as a high call reversal elevator, or for zone operation as discussed, for example, in the aforesaid patents. The invention relates particularly to improvements in zone operation and these will be discussed below in detail.

A push-button switch 27 is provided in car A to permit the attendant to by-pass the calls ahead of his car when it is loaded or whenever the attendant desires to operate the car straight through.

*Apparatus in Fig. 2*

Fig. 2 illustrates an enlarged view of the floor selector 16 of Fig. 1. In this figure, the various stationary contact segments are represented by rectangles and most of the contacting brushes by small circles. The brush carriage 17 is shown by dotted lines in the position it occupies when the associated car is stopped at the third floor.

The contact segments $a2$ to $a7$ on the floor selector are disposed to be successively engaged by the brush 30 to control the high car call relay H and by the brush 31 for completing stop circuits set up by the call push buttons in the car for up direction stops. The brush 30 should be long enough to bridge adjacent contact segments.

The contact segments $b2$ to $b6$ and the brush 32 are for connecting the circuits of the stop buttons 2U, etc., at the floor landings for up stops. The up contact segments $c2$ to $c6$ and the brush 33 are provided for connecting circuits for cancelling stop calls registered by the up hall call buttons 2U, etc. When connected for zone operation, the low zone cars do not answer up floor calls, but the up contact segments may be employed by these cars when the system is connected for "up-peak" operation or for "off peak" operation if the cars are to answer up floor calls under such operating conditions. The up contact segments $d1$ to $d5$ and the brush 34 connect circuits for the high call relay to be described later. The contact segments $e1$ to $e4$ and the brush 40 connects circuits for limiting relays to be described later. The down cancel contact segments $f2$, etc., and brush 41, the down floor call contact segments $g2$, etc., and brush 42, and the down car call contact segments $h2$, etc., and brush 43 are provided for connecting circuits for the down direction in the same manner as described for the up direction.

The contact segments j2 to j7 coact with the brush jb and the contact segments k2 to k7 coact with the brush kb for certain control functions which will be discussed below.

On the right-hand side of the floor selector, a series of switches 52 to 56 are illustrated as disposed to be operated by a cam 49 on the carriage 17 as it moves from its floor to floor position, for the purpose of controlling a high car call circuit. A contact segment 63 is positioned for engagement by a brush 64 mounted on the carriage 17 when the carriage is between its first and second floor positions. A contact segment 65 is engaged by a brush 66 mounted on the carriage 17 when the carriage is at its seventh floor position. These contact segments and brushes assist in controlling certain relays as hereinafter pointed out.

A cam 60 on the carriage 17 opens a switch 62 when the carriage is in either the first or second floor position. The cam 60 also opens a switch 61 when the carriage is in the first floor position. These switches assist in controlling a quota adjusting relay QM.

Figure 3:
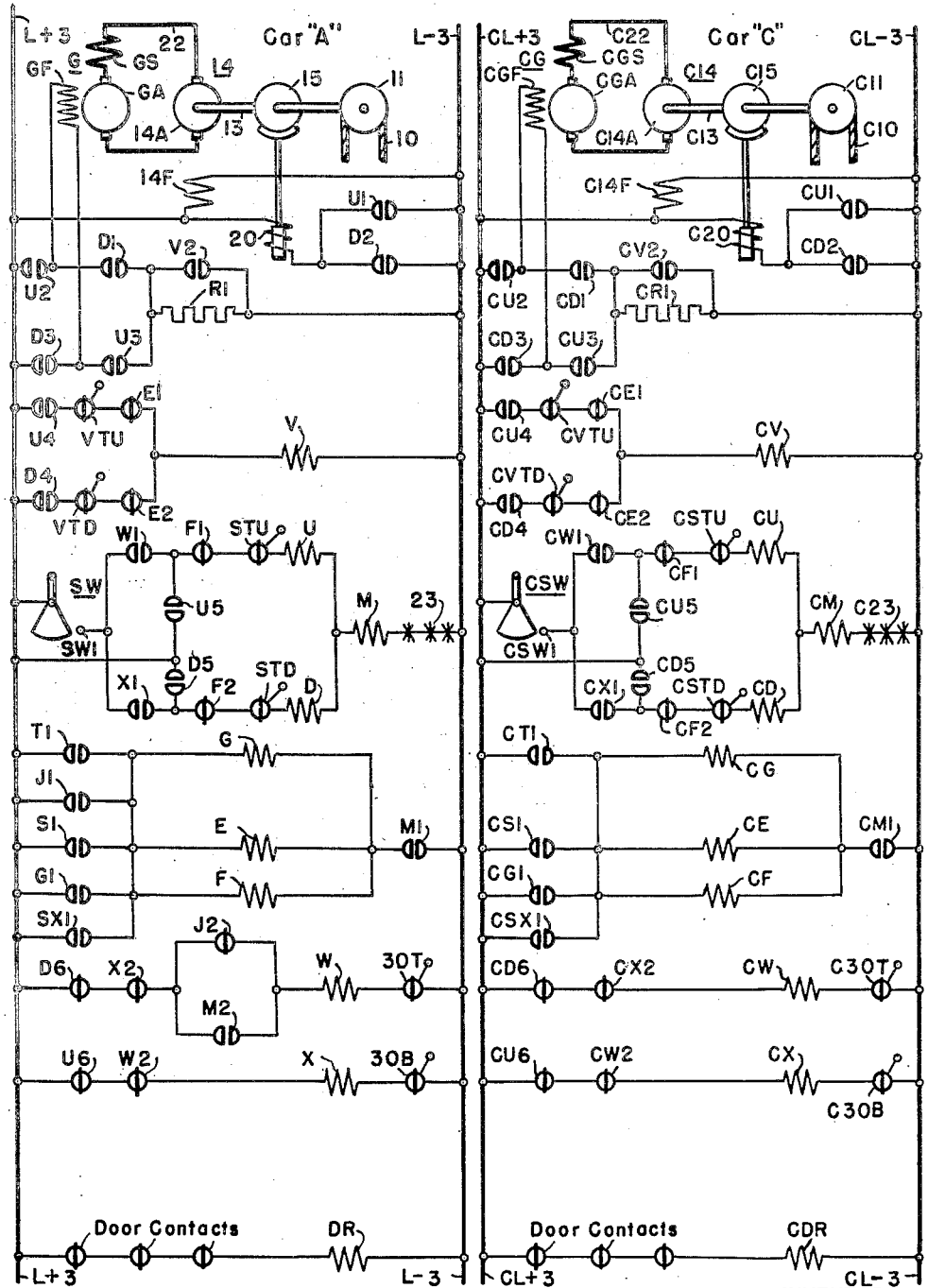
Figure 3A:
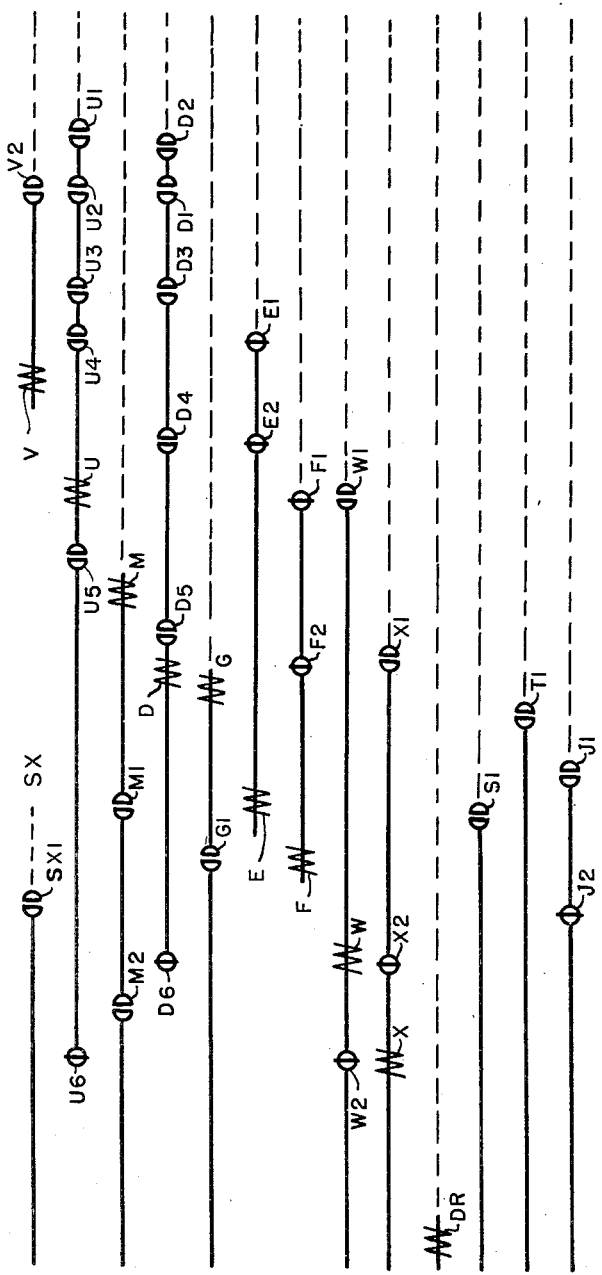

Apparatus in Fig. 3

Referring particularly to Fig. 3 of the drawings, it will be observed that control circuits are shown on the left-hand side which are individual to car A and which are similar to the circuits of car B. At the right-hand side, the circuits shown are individual to car C and are similar to the circuits of car D.

The circuits shown in Fig. 3 for cars A and C may be identical. However, to simplify the drawings, the car C is not provided with a high call reversing relay and does not have relay contacts corresponding to the high call reversing relay contacts J1 and J2 or the car running relay contacts M2 shown in Fig. 3 for the car A.

As shown, the motor 14 is provided with an armature 14A which is mechanically connected to the shaft 13 for driving the sheave 11. The brake 15 is provided with a winding 20 which is energized on energization of the motor 14. The motor 14 includes the usual shunt-type main field winding 14F, which is connected for energization across the direct-current supply conductors L−3 and L+3. The armature 14A is connected for energization by a loop circuit 22 to a generator G which is provided with an armature GA.

In order to control the direction and magnitude of the voltage generated by the generator armature GA, a separately-excited main field winding GF is provided for the generator G. A field resistor R1 is included in the circuit of the field winding GF to provide speed control for the motor 14. The generator G is provided with suitable means such as a series field winding GS for correcting the speed regulation of the motor 14.

The master switch SW located in the car A is here shown connected to control the energization of the operating windings of an up reversing switch U and a down reversing switch D. The reversing switches U and D are provided with contact members U2, U3 and D1, D3 for connecting the generator field winding GF to the conductors L−3 and L+3 in accordance with the direction in which it is desired to operate the car. When either the up or the down reversing switch U or D is energized, the car running relay M is also energized to condition certain circuits for operation. The common portion of the circuits of the reversing switches U and D and the running relay M includes the usual safety devices indicated diagrammatically at 23.

A high-speed relay V is provided for short-circuiting the resistor R1 disposed in series circuit relation with the generator field winding GF for applying the maximum voltage to that winding when the car is operating at normal high speed. This relay is controlled by contacts U4 and D4 of the switches U and D on starting and by contacts E1, E2 of the slowdown inductor relay E when stopping.

An upper and a lower mechanical limit switch VTU and VTD, are provided for interrupting the circuit of the high-speed relay V when the car reaches a proper slowdown point in advance of the upper and lower terminals, respectively, and an upper and a lower stopping limit switch STU and STD, are provided for opening the circuits of the reversing switches U and D at the terminal limits, in accordance with the usual practice.

An up direction preference relay W and a down direction preference relay X are provided for controlling the direction of operation of the car and performing certain functions in connection therewith. The operating windings of these relays are controlled by a top limit switch 30T, a bottom limit switch 30B and the high-call reversal relays. Each of the limit switches 30T and 30B is arranged to be opened when car A arrives at the corresponding terminal, thereby interrupting the circuit of the direction preference relay W or X corresponding to the direction of operation of the car. Also when the high call reversal relays operate while the car is between terminals, the relays W and X are operated to reverse the direction switches. Hence the car attendant does not need to do anything except close or open the car switch SW and operate the car call buttons.

Although cars C and D may be provided with conventional circuits for reversing the cars at their highest calls, as previously pointed out, such circuits are not illustrated here.

Figure 5:
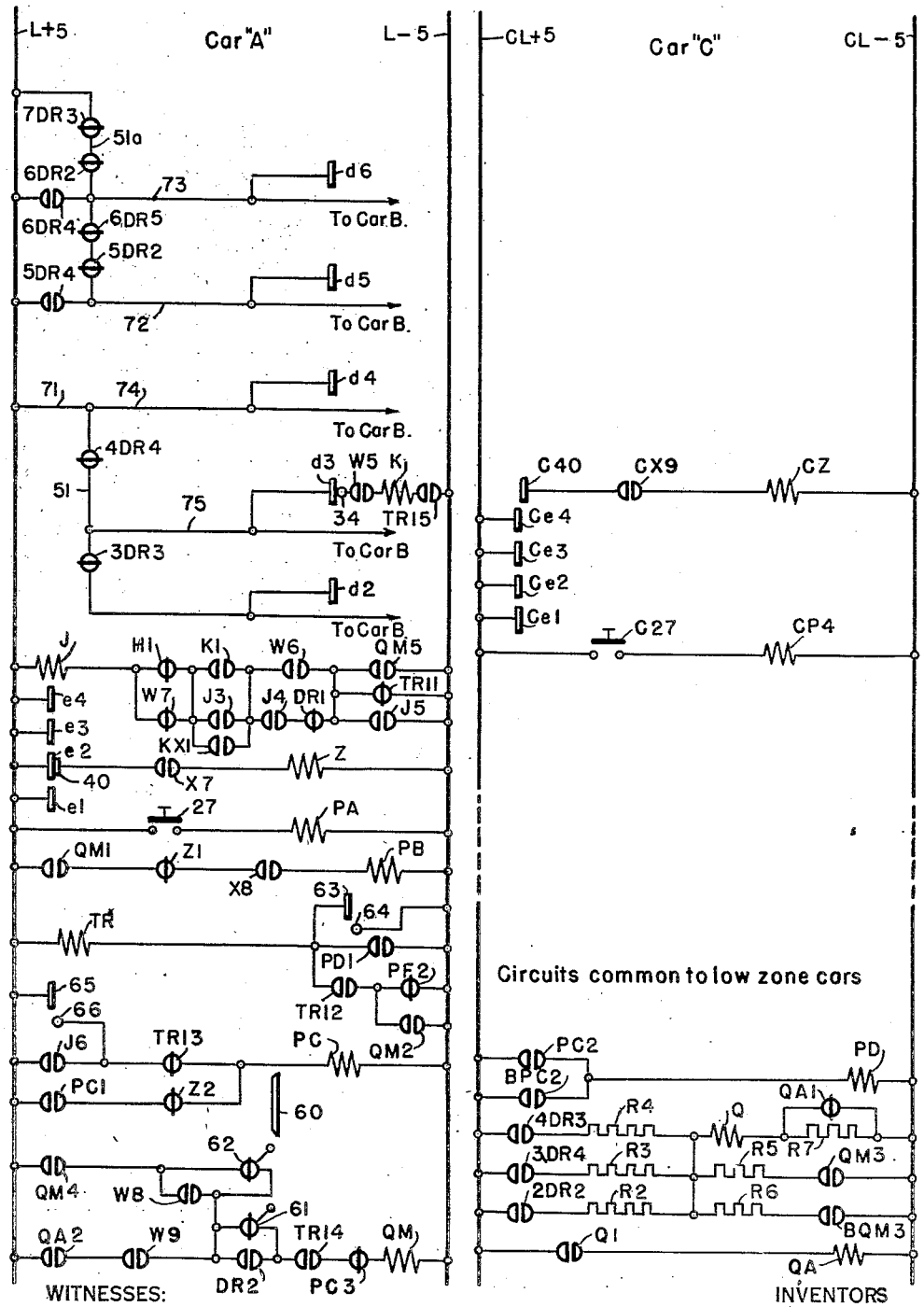
Figure 5A:
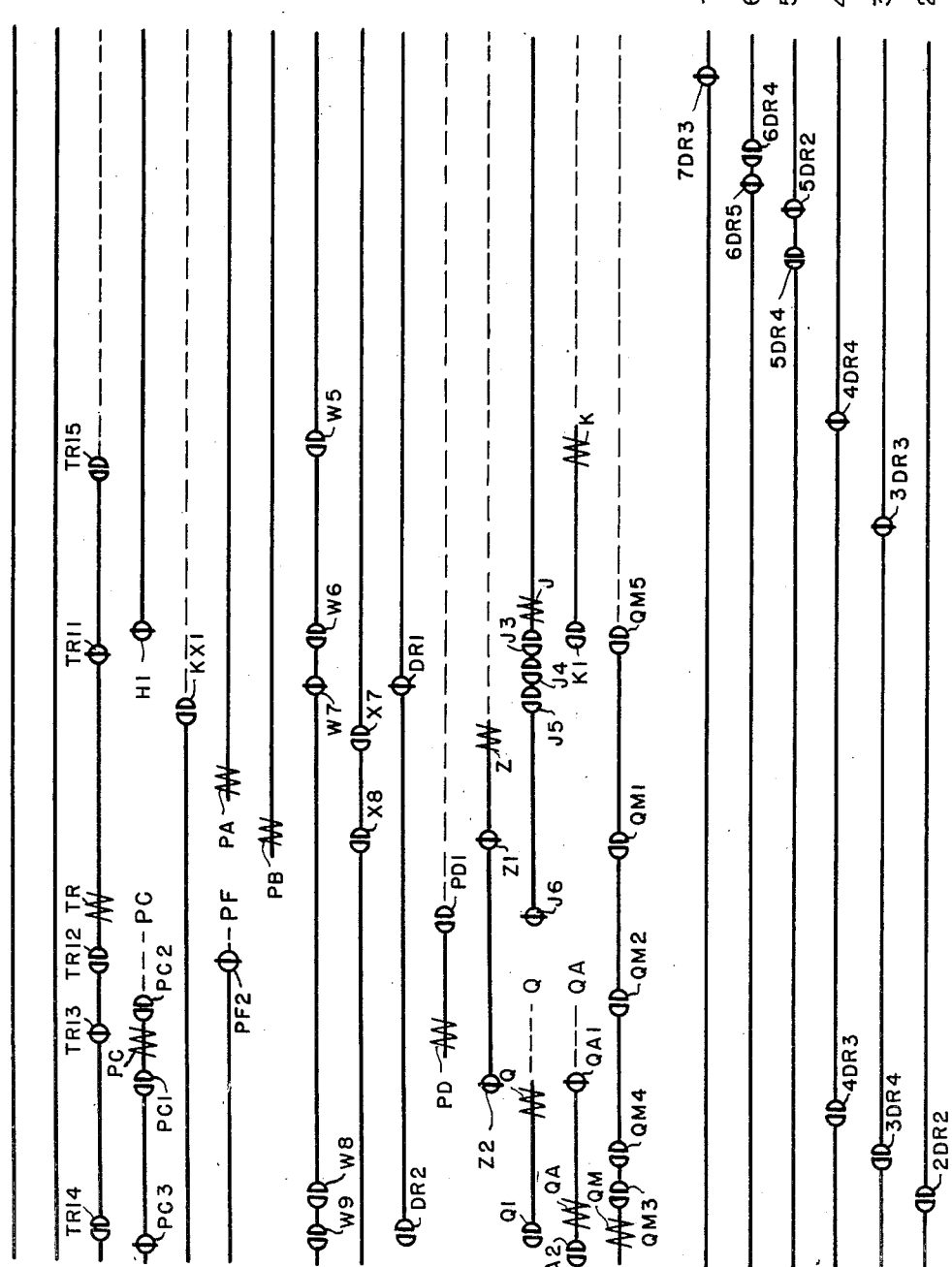
Figure 6:
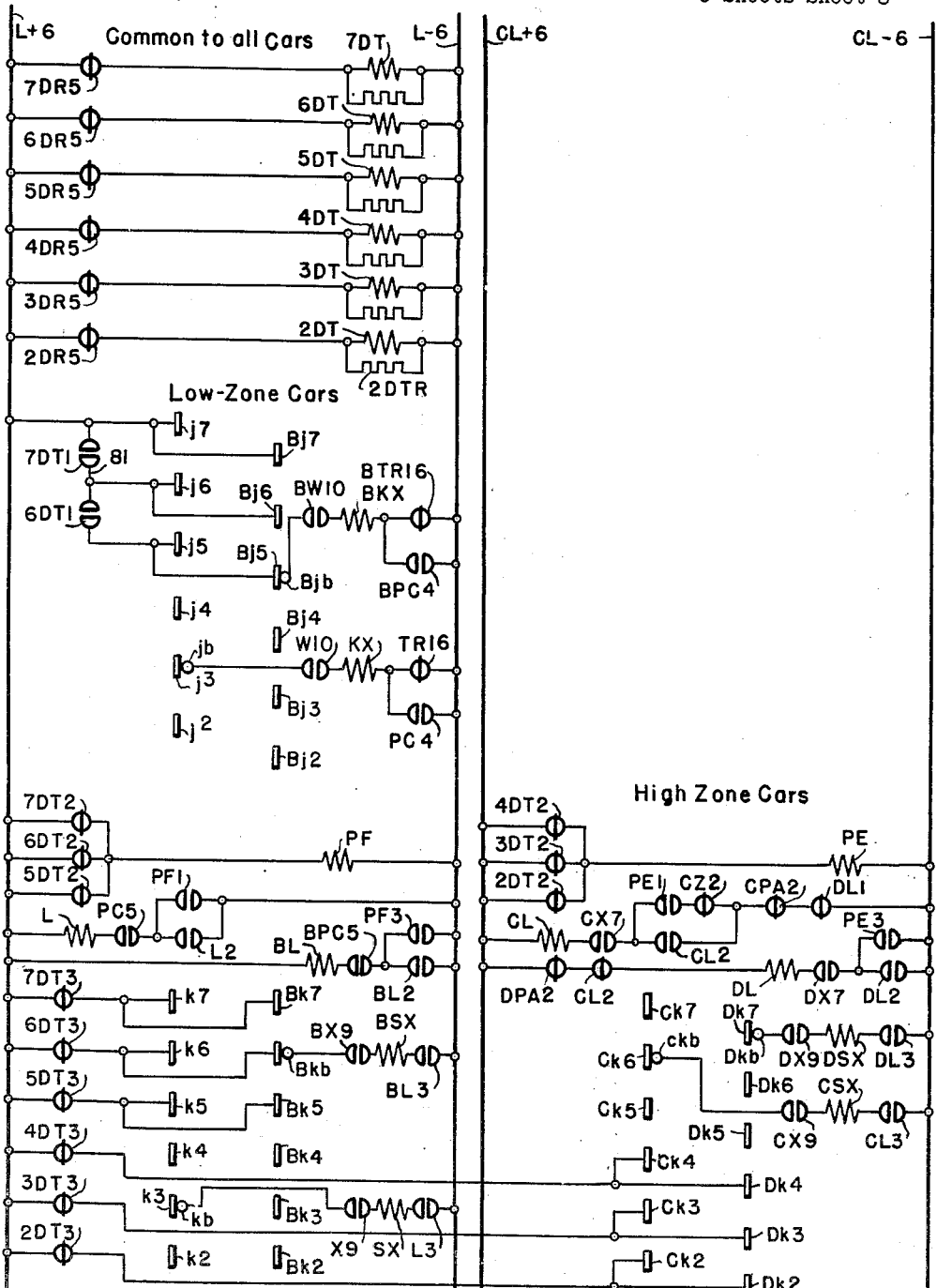
Figure 6A:
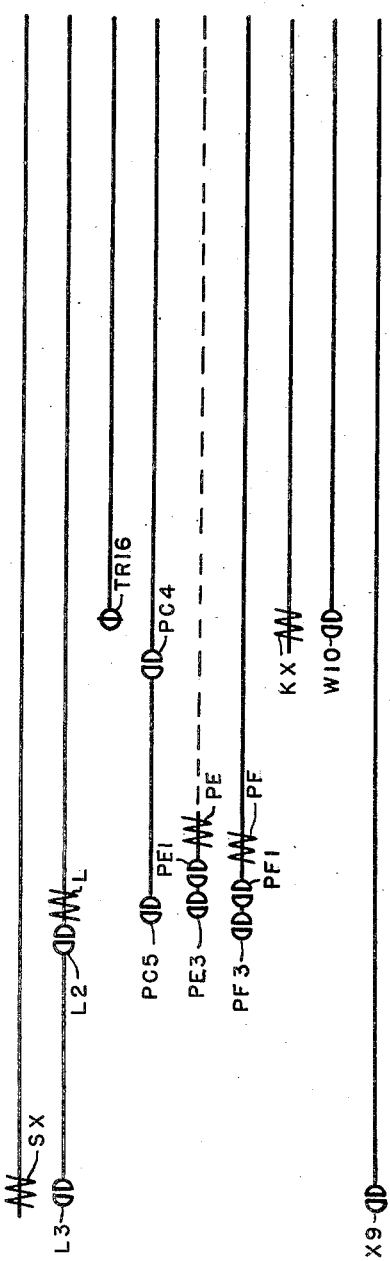
Figure 6A:
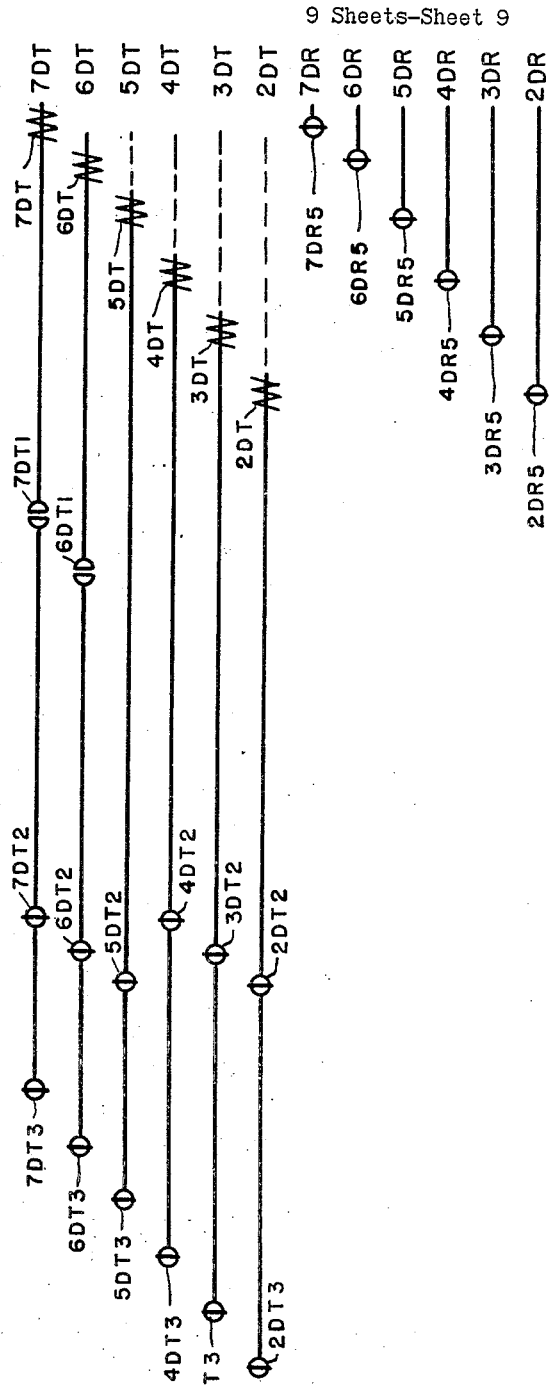

The energizing coils for the slowdown inductor switch E and the stopping inductor switch F, are illustrated in this figure as arranged to be energized on operation of the contacts S1 of a hall call stopping relay S, the contacts T1 of a car call stopping relay T, the contacts J1 of a high call reversing relay J, or the contacts SX1 of an auxiliary hall call stopping relay SX. (The operating coils for relays S and T are illustrated in Fig. 4, the coil for relay J is illustrated in Fig. 5 and the coil for the relay SX is illustrated in Fig. 6, and will be described in connection therewith.)

An inductor holding relay G is provided for maintaining the inductor relays in energized condition during a decelerating or stopping operation.

A door relay DR is illustrated as controlled by a plurality of door safety contacts. The relay DR may be used for various safety circuits, and it is also used for assisting in the control of the quota modifying relay QM and the high call reversing relay J shown in Fig. 5.

Figure 4:
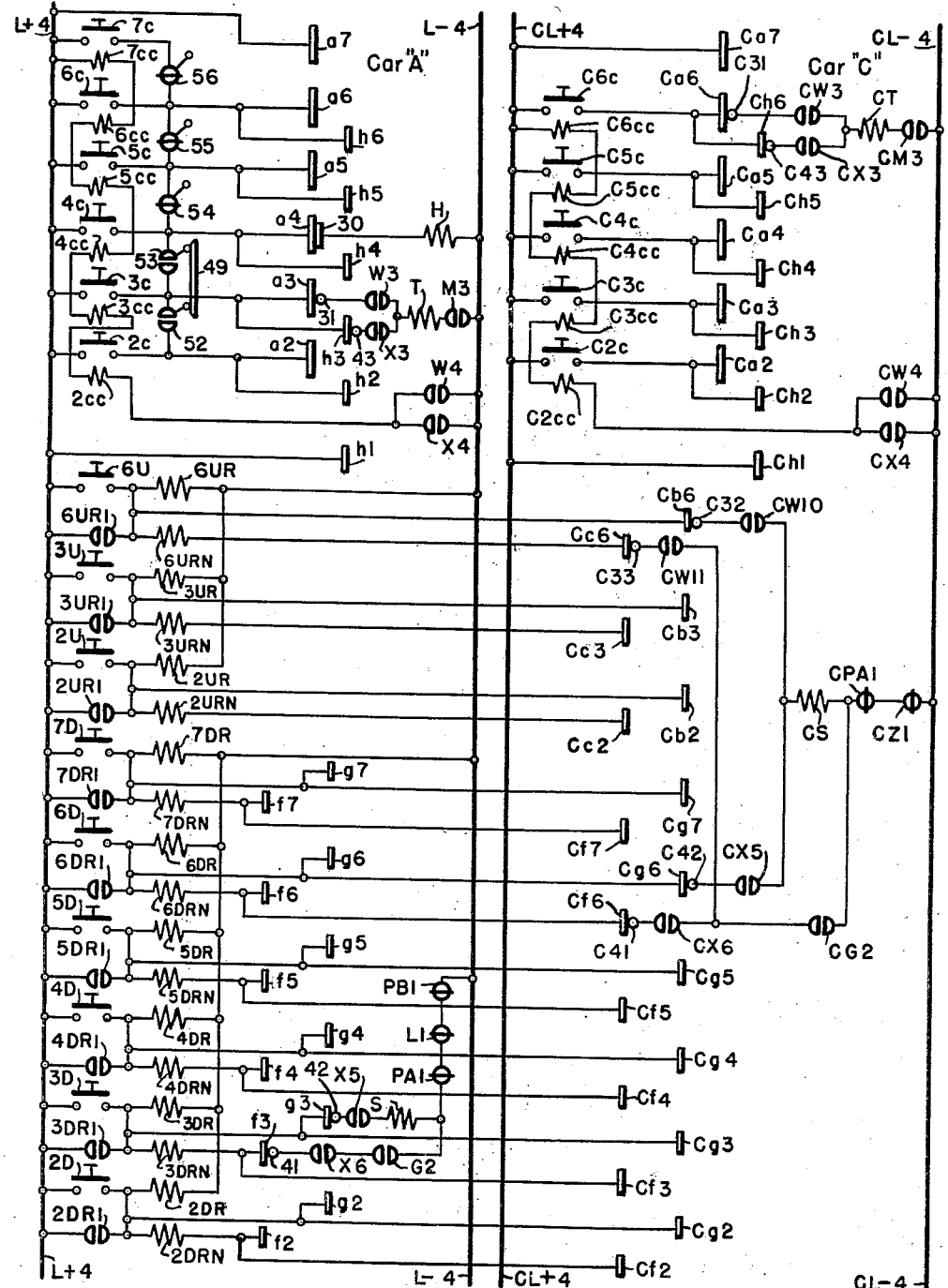
Figure 4A:
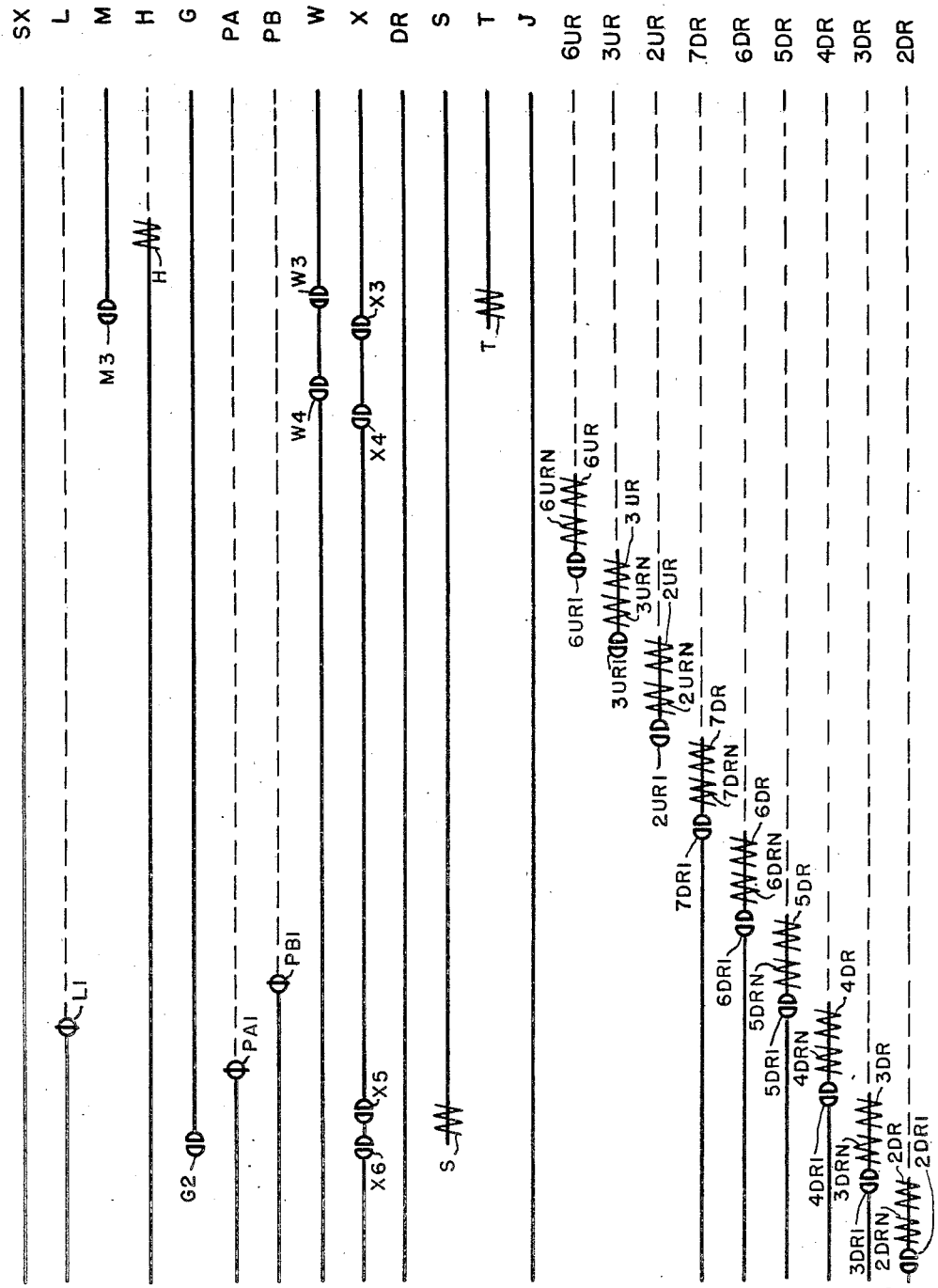

Apparatus in Fig. 4

The car buttons 2c, etc., described in connection with Fig. 1, are illustrated with their holding coils 2cc, etc., and circuit in the upper part of Fig. 4, in connection with the high car call relay H and the stopping relay T. The coils 2cc, etc., are energized when the car starts in either direction to hold in the car buttons 2c, 3c, etc., as they are operated, until the direction of the car is reversed, so that the temporary operation of a car button by the attendant will cause it to remain in operated condition until the car is reversed. Energy for the various control operations is derived from the direct current conductors or buses L+4, L—4 which may be extensions of the conductors L+3, L—3.

The high car call relay H is used to prevent relay J (Fig. 5) from reversing the car at the highest registered down floor call when a stop call for a floor above is registered on the stop buttons in the car. It is connected by brush 30 to the row of contact segments a2, etc., on the floor selector 46, so that it will be energized whenever a stop call is registered on one of the stop buttons in car A for a floor above the car. The switches 52–56, inclusive, operated by the cam 49, are shown as disposed in the circuits of the car buttons to prevent energization of the relay H by operated stop buttons in car A for floors below that car. The cam 49 has a length sufficient to bridge two of the switches.

Since no high call reversing relay is illustrated for the car C, a relay corresponding to the high car call relay H is not shown for the car C.

The car stopping relay T is connected to the up brush 31 engaging the row of contact segments a2, etc., and to the down brush 43 engaging the row of contact segments h2, etc.; so that, when a call is registered on a car button and the car approaches the energized contact segment corresponding thereto, relay T will be energized to stop the car by energizing the inductor relays F and E.

The floor or hall buttons 2U, 2D, etc., described in connection with Fig. 1 are shown with their circuits in the lower part of Fig. 4. Associated with each floor button is a call registering or storing relay by means of which the momentary pressing of the buttons will set up or register a stop call which will hold itself until it is answered by the stopping of a car at that floor for the direction of the registered call. The call registering relays are designated as 2DR to 7DR for the down direction and as 2UR, 3UR and 6UR for the up direction. For simplicity, the up direction registering relays and floor buttons for only the second, third and sixth floors are shown, as the up buttons and registering relays for the other floors will be readily understood.

The down call registering relays, when energized, close circuits to the row of contact segments g2, etc., and the up registering relays, when energized, close circuits to the row of contact segments cb2, etc., on the floor selector so that the contact segment for a floor for which a call is registered is energized as long as the call exists.

A car stopping relay S is shown as connected to the down brush 42 engaging segment g2, etc. (Since the car C is responsive to up calls, its car stopping relay CS is connected not only to the down brush C42, but to the up brush C32 which engages the segments cb2, etc.) When the car approaches a floor in a down direction for which a down call is registered, the corresponding brush engages the energized contact segment for that floor and thereby causes the relay S to be energized, which, in turn, energizes the inductor relays F and E of that car to effect the stopping of that car at that floor.

It will be recalled that the car A is a low zone car and does not answer up calls. Consequently, the up floor buttons in Fig. 4 are shown associated only with the relay CS of car C. However, up contact segments b2 to b6 may be provided for the car A to facilitate reconnection of a low zone car for normal, high zone or other operation.

A cancellation coil is wound in opposition to each call registering coil and connected to an appropriate one of the cancellation contact segments on the floor selector. The up cancellation coils are designated as 2URN, etc., connected to the up segments Cc2, etc., of the car C, and the down cancellation coils as 2DRN, etc., connected to the down segments f2, etc., of all of the cars. As the brush C33 moves over the segments Cc2, etc., of the car C, and the brush 41 (or C41) moves over the segments f2, etc. (or cf2, etc.), they energize the cancellation coil for any floor at which a car stops to answer a stop call.

Contacts of the relays G, M, W and X are shown for controlling the connections of various circuits. It is believed that such contacts may be traced readily on the drawings and that their purposes will be apparent from the discussion herein presented.

*Apparatus in Fig. 5*

Fig. 5 embodies the high floor call relay K, the high call reversing relay J, the quota relay Q and the transfer relay TR together with the operating circuits therefor. The circuits for cars A and C shown in Fig. 5 for the most part are dissimilar.

The high floor call relay K of car A is provided for controlling the operation of the high call reversing relay J for that car in accordance with the existence or non-existence of registered floor calls above it. If the contacts WS and TR15 are closed, the relay K is connected for energization through the low zone circuit comprising a conductor 51 and its auxiliary conductor 51a. The circuits 51 and 51a are common to all the low zone cars. Arrows indicate conductors which extend from these common circuits to the corresponding transfer relay contacts for the car B.

The circuit 51 includes back contacts of only the down call registering relays for the floors included in the lower zone and they are arranged in series according to the natural sequence of the floors and the circuit is connected at floor points with the contact segments d2—d4. A conductor 71 connects the top contact segment d4 for the low zone directly to the supply conductor L+5. Therefore, when the relay TR is energized, the relay K will not be energized as long as a down call exists at a floor in the low zone above the car but as soon as the car reaches the uppermost registered down call in the low zone or as soon as the car reaches the top floor of the low zone, its relay K will be energized.

The circuit 51 and the contacts therein provide a means for dividing the floors into zones. The number of floors included in the low zone is determined by the number of lower floors having their hall call registering relay contacts included in the low zone circuit 51. The high zone includes the floors above the low zone. If it is desired to include more floors, in the low zone, then back contacts of the down hall call registering relays for more floors are included in circuit 51. For instance, if it is desired to change the present system to a low zone of five floors, this can be effected simply by moving the pair of back contacts 5DR2 of the down call registering device 5DR for the fifth floor into the low zone circuit 51 (Fig. 5) in a manner similar to the contacts 4DR4 and by eliminating the contacts 5DR4 and 6DR5 from the circuit 51a, so that the low zone cars will reverse in response to a predetermined number of down hall calls for the lower five floors instead of the lower four floors. The conductor 71 would be moved to connect the conductor 72 (which is associated with the fifth floor contact segment $d5$) to the supply conductor L+5.

Also, a contact segment for the fifth floor would be provided in the e-row for each of the floor selectors. For example, a contact segment would be located above the contact segment $e4$ for the car A and above the contact segment $Ce4$ for the car C to control automatic by-passing by these cars in a manner which hereinafter will be set forth.

In accordance with the invention, the auxiliary circuit 51a is a branch of the circuit 51 and includes back contacts for the down call registering devices (such as 5DR2) for the floors above the low zone. Each intermediate down floor call registering relay between the low zone and the upper terminal floor has front contacts connecting the supply conductor L+5 and the contact segment for the floor. For example, the contact segment $d5$ is connected to the supply conductor L+5 through the conductor 72 and down floor call registering relay contacts 5DR4. As a further example, the contact segment $d6$ is connected to the supply conductor L+5 through a conductor 73 and the down floor call registering relay contacts 6DR4. The conductor 72 is connected in succession through the back contacts 5DR2 and 6DR5 to the conductor 73. In a somewhat similar manner, the conductor 73 is connected through the back contacts 6DR2 and 7DR3 of the down floor call registering relays for the sixth and seventh (or upper terminal) floors to the supply conductor L+5. When car A is a low zone car operating on the circuits 51 and 51a under control of the quota device, the relay K is energized when car A is travelling up in the upper zone only at the first down call above it, or if no down call exists above the car, the relay K is energized when the car reaches the next floor.

Additional floors readily can be included in the circuit 51a. For example, let it be assumed that the fourth floor is to be included therein. The conductor 71 is moved to connect the conductor 75 to the supply conductor L+5, and the back contacts 4DR4 are omitted. Front contacts of the down call storing relay 4DR are employed for connecting the conductor 74 to the supply conductor L+5 in the same way whereby the back contacts 5DR4 connect the conductor 72 to the supply conductor L+5. In addition, back contacts of the down call storing relays 4DR and 5DR are successively connected in series between the conductors 74 and 72 in the same manner whereby the back contacts 5DR2 and 6DR5 connect the conductors 72 and 73. These changes should be accompanied by removal or disconnection of the fourth floor contact segment in the e-row of each floor selector. For example, the contact segment $e4$ for the car A and the contact segment $Ce4$ for the car C should be removed or disconnected. Such contact segments control automatic by-passing of the cars and their function will be discussed in greater detail below. These changes result in movement of the load center to a position between the third and fourth floors.

The relay J stops the car by closing its contacts in the circuit of the inductor relays E and F (Fig. 3), and it then reverses the stopped car by opening its contacts J2 in the circuit of the up direction preference relay W (Fig. 3). When the transfer relay is energized and the quota is not filled, the relay J is ineffective and the car travels to the upper terminal floor.

When a low zone car leaves the lower terminal on a trip, it starts up on the circuit 51, but is incapable of actuating the reversing relay J. If a sufficient number of down calls are registered in the low zone to operate the quota device, that device may render the reversing relay J effective so that the low zone car will stop and reverse at the highest down call in the low zone, or at the lowest down call above the car in the upper zone (or at the next floor in the upper zone if no upper zone calls are registered), depending upon the position of the car in the hatchway, at the time the quota is filled.

The transfer relay TR is provided for transferring the relay K from control by the circuits 51 and 51a to an inactive condition when the low zone car is to answer a priority call in the high zone. Under these conditions, the relay J is rendered effective for reversing the direction of operation of the car at the floor above the car corresponding to the highest registered priority down call.

The quota relay Q is provided for totalizing the down calls in the low zone. It is common to all the low zone cars and its energized operation is determined by the number of down calls in existence and the number of low zone cars moving up in the low zone.

The energization of the quota relay is controlled by a plurality of branch circuits, each of which includes a quota resistor, such as R2, and which are controlled by contacts operated by the down floor call relays, such as 2DR, in the low zone, and by a plurality of branch circuits, each of which includes a resistor, such as R5, and which are controlled by contacts operated by the quota modifying relays, such as QM. The quota relay and the resistors together with their connections are so designed and controlled that the relay will be responsive not only to the number of registered down calls that exist in the low zone, but also to the number of low zone cars that are travelling in the up direction.

For example, let it be assumed that seven or more floors are included in the low zone, and that car A is conditioned as a low zone car and is going up. As long as no down call is registered in the low zone, the relay Q is not energized. If only one down call in the low zone is registered, the relay Q still remains unoperated because sufficient current does not flow through the one connected resistor to actuate the relay Q. As soon as two down calls in the low zone are registered, sufficient current flows through the two connected resistors in parallel to actuate the relay Q. The resistors and the relay Q are normally designed to effect operation of the relay Q whenever two down calls in the low zone exist and only one low zone car is going up; to require two more calls (i. e., a total of four calls) for a second car entering the low zone after the first car has been selected and is still in the low zone, and to require two more calls (i. e., a total of six calls) to operate for a third car entering the low zone after the first two cars have been selected and are still in the low zone. This is effected because operation of the quota relay operates relays QM, BQM, etc., to add additional resistors R5, R6, etc., in parallel with the relay Q.

Since only three down hall buttons are shown in the low zone, it may be assumed, for illustrative purposes, that two registered low zone down calls suffice to pick up the quota relay Q alone, and three registered low zone down calls suffice to pick up the relay Q when the resistor R5 is connected thereacross.

The quota-adjusting relay QM is provided for so controlling the branch circuits of the relay Q as to energize that relay in accordance with the number of low zone cars in the low zone and the number of down floor calls registered in the low zone.

If two cars are in the low zone when two low zone down calls are registered, the quickest acting relay QM or BQM will be energized and its car will be reversed and the other car will not be reversed until more low zone down calls are registered.

When the car A leaves the first floor, the transfer relay TR is energized as a result of engagement of the contact segment 63 by the brush 64. This means that the high call floor relay K is associated with the circuits 51 and 51a. However, energization of the transfer relay TR also opens contacts TR11. As long as the contacts TR11, QM5 and J5 are open, the high call reversing relay J cannot be energized, and the car A will run from the ground floor to the upper terminal floor. In order to condition the high call reversing relay J for energization, either the contacts TR11 or the contacts QM5 must be closed.

Closure of the contacts QM5 is controlled in part by the quota relay Q. Referring to Fig. 5, it will be noted that energization of the quota relay Q closes contacts Q1 to energize a quota auxiliary relay QA. Energization of the quota auxiliary relay QA opens contacts QA1 to introduce a resistor R7 in series with the winding of the quota relay Q. The resistor reduces the current flowing through the winding of the quota relay Q and the relay drops out to open its contacts Q1 as soon as contacts QM3 close. Opening of the contacts Q1 deenergizes the auxiliary relay QA and re-establishes the shunt path across the resistor R7. Consequently, the quota relay is conditioned for a subsequent operation, but as long as the contacts QM3 remain closed, the quota relay Q is bridged by the resistor R5.

When the auxiliary relay QA is energized, it also closes contacts QA2 which are associated with the quota modifying relay QM. If the car A is at the ground floor, the transfer relay TR is energized (or the relay will be energized as the car A leaves the ground floor) and the contacts TR4 consequently are closed. The up preference relay contacts W9 are closed but the switch 61 is open and the door relay contacts DR2 may be open. As soon as the doors of car A are closed, the relay QM is energized and establishes a holding circuit through contacts QM4, W8 and DR2.

The transfer relay TR has a first holding circuit which is completed through the contacts TR2 and PF2. Energization of the quota modifying relay QM establishes a second holding circuit for the transfer relay through the contacts TR2 and QM2. The latter holding circuit is independent of the relay contacts PF2.

The holding circuit for the quota modifying relay QM is controlled by several contacts. After the car A leaves the ground floor, the switch 61 closes to prevent subsequent opening of the door relay contacts DR2 from interrupting the holding circuit of the quota modifying relay QM. Consequently, until the car A completes its low zone assignment, the contacts QM3 remain closed to modify the response of the quota relay Q.

When the car A reverses to return to the ground floor, the up preference relay contacts W8 and W9 open. Upon return of the car A to the second floor, the switch 62 is reopened by its cam to interrupt the holding circuit for the quota modifying relay QM. Deenergization of this relay restores the circuits associated with the quota relay Q to the condition illustrated in Fig. 5. By lengthening or shortening the cam 60 of the switch 62, the position of the car A at the time the quota relay is restored may be adjusted as desired. In the present case, restoration takes place when the car A reaches the second floor.

Referring again to the high call reversing relay J, the closure of the quota modifying relay contacts QM5 conditions the relay J for energization. If the car A is moving in an up direction, the up direction preference relay contacts W6 are closed. Assuming that no car call buttons are actuated, the high car call relay contacts H1 are closed. Consequently, upon closure of the contacts K1 an energizing circuit is completed for the high call reversing relay J, and the car A is reversed.

If the car A is in the low zone conditioned to move in an up direction at the moment the quota modifying relay contacts QM5 close, the car will reverse at the highest registered down call in the low zone. Such reversal results from energization of the high floor call relay K through the brush 34 and the circuit 51. Unless the bypass switch 27 is manually actuated, the car A will pick up all down calls during its return to the ground floor.

Should the car A be conditioned to move upwardly in the high zone at the time the contacts QM5 close, it will reverse at the lowest down call above the car as a result of energization of the relay K through the brush 34 and the circuit 51a. If no down call exists above the car A at this time, the high floor call relay K will be energized through the brush 34 and the circuit 51a at the next floor to complete an energizing circuit for the reversing relay J.

When the high call reversing relay J is energized, it establishes a holding circuit through contacts H1, J3, W6 and J5. Stopping of the car deenergizes the up direction preference relay W to close the contacts W7 and open the contacts W6. Since the doors start to open before the relay W is deenergized, the door relay contacts DR1 maintain the holding circuit and the high call reversing relay J remains energized until the doors of the car A are reclosed to separate the contacts DR1 of the door relay.

Assuming that the car A is in the high zone at the time operation of the quota relay Q results in a reversal of the car, it is desirable that the car return promptly to the low zone without making any intermediate stops. Such operation is provided by a load center or limiting relay Z. Energization of the relay Z is derived through the contact segments e1-e8, the brush 40 and front contacts X7 of the down direction preference relay X. The brush 40 may be designed to bridge the distance between the successive contact segments e1-e4. It will be noted that the limiting relay Z is energized only when the car A is moving down in the low zone.

Contact Z1 of the limiting relay Z in cooperation with front contacts QM1 of the quota modifying relay and front contacts X8 of the down direction preference relay X control the energization of a by-pass relay PB. When the by-pass relay PB is energized, its contacts PB1 (Fig. 4) are open to prevent energization of the floor call stopping relay S. Consequently, as long as the by-pass relay PB is energized, the car A will not stop for floor calls.

If the quota modifying relay is deenergized, the by-pass relay PB is also deenergized, and the car A can answer floor calls unless the manual by-pass switch 27 is actuated. However, if the quota modifying relay QM is energized while the car A is in the high zone, and if the car A is travelling down, the by-pass relay PB is energized and the car cannot answer floor calls. When the car A reaches the low zone, the limiting relay Z is energized through the contact segments e1 to e4 to open its contacts Z1. This deenergizes the by-pass relay PB which closes its back contacts PB1 (Fig. 4) and permits the car A to answer down floor calls in the low zone.

A high zone car, such as the car C, normally by-passes down floor calls in the low zone. Referring to Fig. 5, it will be noted that a limiting relay CZ is connected through front contacts CX9 of the down direction preference relay for the car C to brush C40 which coacts with contact segments Ce1 to Ce4. Consequently, when the high zone car C is travelling down in the low zone, the limiting relay CZ is energized to open its contacts CZ1 (Fig. 4). As long as the contacts CZ1 remain open, the stopping relay Cs is ineffective for stopping the car.

When the car A leaves the ground floor, the transfer relay TR is energized by engagement of the contact segment 63 by the contact brush 64 (if it is not already energized). A holding circuit for the relay is established through its front contacts TR12 and the back contacts PF2 of the relay PF. This conditions the car A for control by the circuits 51 and 51a in the manner previously discussed.

Assuming that the car A has left the ground floor, opening of the contacts PF2 results in deenergization of the transfer relay TR. Such deenergization renders the relay K ineffective. It will be recalled that deenergization of the transfer relay TR is accompanied by closure of the contacts TR11. Such closure conditions the high call reversing relay J for operation when the car is travelling up and the contacts H1 and KX1 are closed. Consequently, the car A enters the high zone to assist the high zone cars in a manner which will be discussed in connection with Fig. 6. When the car returns to the ground floor, engagement of the contact segment 63 by the brush 64 reenergizes the transfer relay TR and restores the car to control by the circuits 51 and 51a.

It should be noted that if the quota modifying relay QM is energized, the contacts QM2 are closed to shunt the contacts PF2. Under such conditions, the opening of the contacts PF2 cannot affect the transfer relay TR and no low zone car is assigned to assist the high zone cars. However, after the transfer relay TR has been deenergized, the contacts TR12 are open and closure of the contacts QM2 of the quota modifying relay cannot affect the transfer relay. In addition, the contacts TR14 are open and render the relay QM inoperative. Therefore, operation of the quota relay Q after a low zone car has been assigned to assist the high zone cars cannot cancel the assignment.

After a low zone car has accepted an assignment to assist the high zone cars, the remaining low zone cars are restored for control by the quota relay Q. Such restoration is effected by an auxiliary transfer control relay PD which has front contacts PD1 for energizing the transfer relay TR independently of the contact segment 63 and the brush 64.

Energization of the auxiliary transfer control relay PD is independently effected by a separate transfer control relay associated with each of the low zone cars. For example, the car A has a transfer control relay PC which, when energized, closes contacts PC2 to energize the auxiliary transfer control relay PD. Similarly, the car B has contacts BPC2 of a similar transfer control relay connected in parallel with the contacts PC2.

Contacts J6 and TR13 respectively associated with the high call reversing relay J and the transfer relay TR control the energization of the transfer control relay PC. If the car A is assigned to assist the high zone cars, the back contacts TR13 are closed. As soon as the high call reversing relay J is energized, its contacts J6 close to complete an energizing circuit for the transfer control relay PC through the contacts TR13. The resulting energization of the relay PC closes the contacts PC2 to energize the auxiliary transfer control relay PD. The relay PD, when energized, closes its contacts PD1 and restores the remainder of the low zone cars to control by the quota relay. Since the high call reversing relay J is energized when the car A is at an appreciable distance from the floor at which it reverses (possibly two or more floors away), the remainder of the low zone cars are restored to quota control as soon as convenient.

Energization of the transfer control relay PC also opens contacts PC3 to prevent energization of the quota modifying relay QM.

When the transfer control relay PC is energized, it additionally closes contacts PC1 which cooperate with the contacts Z2 of the limiting relay to establish a holding circuit for the relay PC. When the car A moving downwardly enters the low zone, the limiting relay Z is energized to open its contacts Z2 and deenergize the transfer control relay PC. This restores the car A for control by the quota modifying relay QM and the quota relay Q.

If a low zone car is adjacent the upper terminal floor when special service by a low zone car is desired, it is preferable that no other low zone car be specifically assigned to assist the high zone cars. To this end, the contact segment 65 is positioned for engagement by the brush 66 when the car A is adjacent to its upper terminal floor. The contact segment and brush shunt the contacts J6 and cooperate with the back contacts TR13 to establish an energizing circuit for the transfer control relay PC.

Let it be assumed that the car A is adjacent the upper terminal when special service by a low zone car is desired. If the quota modifying relay QM is deenergized, the energization of the special service relay PF opens its contacts PF2 to deenergize the transfer relay TR. When the transfer relay TR is deenergized, the contacts TR13 close and connect the transfer control relay PC across the supply conductors L+5, L—5 through the brush 66 and contact segment 65. The resulting energization of the transfer control relay PC closes the contacts PC1 to establish with the contacts Z2 a holding circuit for the relay PC. The contacts PC also close to energize the auxiliary transfer control relay PD. The relay PD closes its contacts PD1 to reenergize the transfer relays of all low zone cars. The transfer control relay PC also has opened its contacts PC3 to prevent energization of the quota modifying relay QM. This permits the car A to answer special service down calls on its return to the ground floor. The remainder of the low zone cars are subject to control by the quota relay Q. When the car A arrives at the low zone on its return to the ground floor, the energization of the limiting relay Z opens the back contacts Z2 to deenergize the transfer control relay PC. Consequently, the relay PC opens its contacts PC2 to deenergize the auxiliary transfer control relay PD and closes its contacts PC3 to permit energization of the quota modifying relay QM.

*Apparatus in Figure 6*

Fig. 6 illustrates the circuits associated with the down floor call time delay relays 2DT to 7DT which are employed for timing the various down floor calls. If a down floor call remains unanswered for a predetermined time, the associated time delay relays drops out to establish such call as a priority call.

Fig. 6 also discloses circuits for the auxiliary high priority floor call relay KX, the special service control relay PE which is common to all high zone cars, and the special service control relay PF which is common to all low zone cars. Also Fig. 6 shows the shift relay L which is employed for shifting a low zone car from basic or standard down floor call service to priority down floor call service. In addition, circuits for the auxiliary floor call stopping relay SX are illustrated in Fig. 6. This auxiliary floor call stopping relay is effective for priority down floor call service.

The down floor call time delay relays 2DT to 7DT are common to all of the cars. These relays are energized respectively through back contacts 2DR5 to 7DR5 of the down call storing relays. Since similar circuits are employed for the various floors, a description of the circuits for the second floor suffices.

By reference to Fig. 6, it will be observed that the time delay relay 2DT is connected between the direct current buses L+6 and L—6 through the back contacts 2DR5 of the down call storing relay for the second floor. Consequently, as long as no down call is registered for the second floor, the time delay relay 2DT remains energized.

When a down floor call is registered for the second floor, the contacts 2DR5 open to deenergize the time delay relay 2DT. However, since the relay has a delayed dropout the relay remains picked up for a predetermined time after the opening of the contacts 2DR5. If the call is answered prior to the expiration of the time delay, the contacts 2DR5 close to reenergize the time delay relay 2DT before the relay can drop out.

The time delay of the relay is represented by a resistor 2DTR which is connected across the coil of the time delay relay 2DT. This resistor may be adjustable for the purpose of permitting ready adjustment of the time delay in drop-out of the relay. However, for present purposes, it will be assumed that the resistor is selected to provide a predetermined time delay within which the down floor call for the second floor should be answered. If desired, different time delays may be employed for various floors. For present purposes, it will be assumed that the same delay is employed for each floor.

The time delay relays have front contacts which are connected in a high priority floor call circuit 81 which is common to all of the low zone cars. These contacts are connected to a row of contact segments on selectors for each of the low zone cars. The number of front contacts of the time delay relays and the number of contact segments utilized depend on the number of floors in the high zone. Since only three floors are assumed to be in the high zone, only three contact segments are connected for each of the low zone selectors to the circuit 81. Thus the car A has three contact segments j5, j6 and j7 connected to the circuit 81 for the fifth, sixth and seventh floors, which comprise the high zone in the assumed case. In Fig. 6, it will be observed that the circuit 81 is connected to the contact segments j5 to j7 for the car A and to the contacts Bj5 to Bj7 for the car B.

The number of time delay relays having front contacts in the circuit 81 also depends on the number of floors in the high zone. For a high zone of three floors, two time delay relays are associated with the circuit. The contacts 6DT1 are connected between the contact segments j5 and j6 and between the contact segments Bj5 and Bj6. Similarly, the contacts 7DT1 are connected between the contact segments j6 and j7 and between contact segments Bj6 and Bj7. The contact segments j7 and Bj7 are connected directly to the direct-current conductor or bus L+6.

The auxiliary high priority floor call relay KX has one terminal connected through the contacts W10 to the brush jb. The remaining terminal of the relay is connected through back contacts TR16 of the transfer relay to the bus or conductor L—6. Contacts PC4 of the transfer control relay are connected across the contacts TR16.

If the contacts W10 are closed signifying that the car A is travelling in an up direction and if the contacts TR16 or PC4 are closed, the relay KX will be energized only when the car reaches the highest priority down call. Consequently, if the car A is conditioned to render special service to priority calls, it will travel to the highest of the priority calls before energizing its auxiliary high priority floor call relay KX to close the contacts KX1 (Fig. 5). Under such conditions, the car A is reversed at the highest of the priority calls.

During the discussion of Fig. 5, reference was made to a special service control relay PF which is common to all of the low zone cars. As shown in Fig. 6, the relay PF may be energized through back contacts of any of the time delay relays for the upper zone floors. Since the upper zone is assumed to contain the three highest floors, the energization of the relay PF is effected through anyone of the back contacts 5DT2, 6DT2 and 7DT2. Therefore, the relay PF is energized only if a down floor call in the upper zone has remained unanswered for a time sufficient to become a priority call.

Upon energization, the special service control relay PF actuates certain contacts which were discussed above with reference to Fig. 5. In addition, the relay, when energized, closes contacts PF1 to prepare the shift relay L for subsequent energization. Consequently, when the transfer control relay PC is energized to close its contacts PC5, the shift relay L is energized. Upon energization, the shift relay L opens its back contacts L1 (Fig. 4) to remove the floor call stopping relay S from service. Also the shift relay closes its contacts L2 (Fig. 6) to establish a holding circuit across the contacts PF1. Finally, the shift relay closes its contacts L3 to prepare the auxiliary floor call stopping relay SX for subsequent energization.

The relay SX is connected to the brush $kb$ through front contacts X9 of the down direction preference relay. It will be recalled that the brush $kb$ successively engages contact segments $k2$ to $k7$ of a selector for the car A. The number of contact segments for which connections are provided depends on the number of floors in the high zone, one being employed for each such floor. Since three floors are assumed to be in the high zone, the car A has three contact segments $k5$, $k6$ and $k7$ which are provided with connections. These contact segments respectively are connected to the bus L+6 through back contacts 5DT3 to 7DT3 of the time delay relays. Thus each contact segment for the high zone is connected to the bus through back contacts of the corresponding time delay relay. Consequently, if the auxiliary floor call stopping relay SX is in service, it is responsive only to priority calls. This relay actuates contacts SX1 (Fig. 3) to control the stopping of the car. In a similar manner the contacts 5DT3 to 7DT3 are associated with an auxiliary floor call stopping relay BSX for the car B.

Fig. 6 also discloses circuits for assigning high zone cars to answer priority calls in the low zone. When any one of the time delay relays for the low zone floors drops out, the special service control relay PE is energized. This relay is common to all of the high zone cars. Since the low zone includes the second, third and fourth floors in the specific embodiment herein discussed, the back contacts 2DT2, 3DT2 and 4DT2 of the low zone time delay relays are connected in parallel for controlling the energization of the relay PE.

The shift relays for the high zone cars have energizing circuits as shown in Fig. 6. The relay CL is energized through front contacts CX7 of the down direction preference relay CX, back contacts CPAZ of the by-pass relay, and back contacts DL1 of the shift relay for the car D. The energizing circuit is completed either through the front contacts PE1 and CZ2 in series, respectively, of the special service control relay and the limiting relay, or through the front contacts CL2 of the shift relay.

Upon energization, the shift relay CL closes contacts CL1 to establish a holding circuit around the contacts PE1 and CZ2. Contacts CL3 close to prepare the auxiliary floor call stopping relay CSX for energization. In addition, the back contacts CL2 open to prevent energization of the shift relay DL for the car D. The back contacts CL2 and DL7 interlock the energizing circuits for the shift relays to permit energization of only one of the shift relays at one time. Consequently, only one of the high zone cars can be assigned to give special service to low zone priority calls at one time.

The relay has a terminal connected to the brush D$kb$ through contacts CX9 of the down direction preference relay for the car C. This brush coacts with the contact segments C$k2$ to C$k4$ which are connected to the bus L+6 respectively through the back contacts 2DT3 to 4DT3 of the time delay relays. Consequently, if the auxiliary floor call stopping relay CSX is in service, it responds only to priority floor calls in the low zone.

Fig. 6 also discloses an auxiliary floor call stopping relay DSX which is associated with contact segments D$k2$ to D$k4$ by circuits which will be understood from the discussion of the relay CSX.

It is believed that the invention will be understood more clearly by reviewing briefly typical operations of the elevator cars. These operations will be discussed only for the system as designed to serve traffic which is predominantly in a down direction. In other words, the system is connected as shown in the drawings for zone operation. It will be recalled that low zone cars, such as cars A and E, give preferential basic service to the low zone floors 1, 2, 3 and 4. High zone cars, such as the cars C and D, give preferential basic service to the high zone floors 5, 6 and 7.

*Basic operation, car C*

Although the high zone car C may be connected to operate high car reversal, it will be assumed for the purpose of discussion that it operates on a through trip basis. It will be recalled that the high zone cars take all up passengers from the ground or reference floor. Moreover, they answer all up calls at all floors. They are dispatched at intervals on arrival at the ground or reference floor and are dispatched instantly on arrival at the upper terminal floor.

Assuming that the car C is at the ground floor with its doors open to receive passengers, the up direction preference relay CW (Fig. 3) will be energized. This is true for the reason that arrival of the car at the ground or reference floor actuates the limit switch C30B which is opened to deenergize the down direction preference relay CX. Closure of the back contacts CX2 of the relay CX establishes an energizing circuit for the up direction preference relay CW across the supply conductors CL+3, CL−3 through the back contacts CD6 of the down switch and the closed contacts of the upper limit switch C30T.

Closure of the doors of the car C results in energization of the door relay CDR, and closure of the car switch CSW completes an energizing circuit for the up direction switch CU and the car running relay CM. This circuit may be traced from the supply conductor CL+3 through the switch CSW, front contacts CW1 of the up direction preference relay, back contact CF1 of the stopping inductor relay, closed contacts of the limit switch CSTU, the winding of the up switch CU, the winding of the car running relay CM and the safety devices C23 to the supply conductor CL−3. Energization of the up switch CU results in establishment of a holding circuit therefor through the front contacts CU5 of the switch.

The switch CU also closes its contacts CU1 to release the brake C15 and closes its contacts CU2, CU3 to energize the field winding CGF with proper polarity to initiate movement of the car C in an up direction. It will be recalled that closure of the contacts CU2, CU3 energizes the field winding CGF through the resistor CR1.

The high speed relay CV is energized in response to closure of the contact CU4 of the up switch through the limit switch CVTU and the back contacts CE1 of the slowdown inductor relay. This results in closure of the contact CV2 to shunt the resistor CR1 and conditions the car C for high speed operation.

Car C runs up at full speed and stops for all up floor calls or all up car calls. It will be recalled that an up floor call results in energization of the floor call stopping relays CS (Fig. 4) to close the contacts CS1 (Fig. 3). Furthermore, a car call results in energization of the car call stopping relay CT (Fig. 4) to close the contacts CT1 (Fig. 3). Closure of either of the contacts CS1 or CT1 energizes the slowdown inductor relay winding CE, the stopping inductor relay winding CF and the inductor holding relay CG which closes its contacts CG1 to maintain the windings energized. While these windings are energized, if the car C passes an up plate CUEP (Fig. 1), contacts CE1 (Fig. 3) are opened to deenergize the high speed relay CV. This results in the slowing down of the car C. As the car C passes the up plate CUFP (Fig. 1), the stopping inductor relay CF picks up to open its contacts CF1 and consequently deenergizes the up switch CU and the car running relay CM. The resulting opening of the up switch contacts CU2 and CU3 deenergizes the field winding CGF and the opening of the contact CU1 results in application of the brake to stop the car C at the desired floor. The deenergization of the car running relay CM results in opening of the contacts CM1 and deenergizes the slowdown inductor relay CE, the stopping inductor relay CF and the inductor holding relay G. After the car C has stopped for an up call, it is restarted in the manner previously discussed.

When the car C arrives at the upper terminal floor, the car call stopping relay CT (Fig. 4) is energized from the contact segments Ca7 of the associated floor selector. Energization of the car call stopping relay CT results in the stopping of the car at the seventh floor in the manner previously discussed. Arrival of the car C at the seventh floor results in opening of the upper limit switch C30T (Fig. 3) to deenergize the up direction preference relay CW. This relay consequently closes the black contacts CW2 to energize the down direction preference relay CX (the contacts CU6 and the lower limit switch C30B are closed). This conditions the car C for a return to the reference or ground floor.

At the expiration of the predetermined dispatching interval (which may be instantaneous in the present case), the car C receives a dispatching signal and the operator closes his doors to energize the door relay CDR. It will be recalled that this relay is energized when the doors are closed and deenergized when the doors are opened. The operator closes the car switch CSW to energize the down switch CD and the car running relay CM. The energizing circuit may be traced from the supply conductor CL+3 through the car switch CSW, front contacts CX1 of the down direction preference relay, back contacts CF2 of the stopping inductor relay, closed contacts of the bottom limit switch CSTD, the windings of the down switch CD, the car running relay CM and the safety devices C23 to the supply conductor CL−3. Contacts CD5 of the down switch CD close to establish a holding circuit for the switch. In addition, the down switch CD closes its contacts CD2 to release the brakes C15 and closes its contacts CD1 and CD3 to energize the field winding CGF and start the car C on its down trip. Closure of the contacts CD4 of the down switch energizes the high speed relay CV to shunt the resistor CR1 and condition the car C for high speed operation.

As the car C moves toward the ground or reference floor, car calls result in the energization of the car call stopping relay CT (Fig. 4) to stop the car C at the desired floor. Furthermore, down floor calls which are registered for the high zone energize the floor car stopping relay CS (Fig. 4) of the car C to stop the car at the desired floor in order to accept passengers desiring transportation to a lower floor. The relays CT and CS operate in a conventional manner to stop the car C at the desired floor. After completion of the desired stop, the car C may be started in a conventional manner to proceed towards the ground or reference floor.

Entry of the car C into the lower zone results in engagement of the contact segment Ce4 (Fig. 5) by the brush C40 to energize the limiting relay CZ. The limiting relay opens its contacts CZ1 (Fig. 4) to prevent energization of the stopping relay CS. As a result, the car C cannot answer down floor calls in the low zone and proceeds directly to the ground floor. It can, of course, stop at low zone floors in response to car calls.

As car C approaches the ground floor, the car call stopping relay CT is energized by engagement of the contact segment Ch1 (Fig. 4) by the brush C43 to stop the car C at the ground or reference floor in a conventional manner. Also in approaching the ground floor, the down direction preference relay CX (Fig. 3) is deenergized in response to opening of the bottom limit switch C30B. In opening, the down direction preference relay CX not only conditions the up direction preference relay CW for energization, but it opens its contacts CX9 (Fig. 5) to deenergize the limiting relay CZ. Opening of contacts CZ1 (Fig. 4) of the limiting relay prepares the stopping relay CS for operation during the next upward trip of the car C.

*Basic operation, car A*

It will be recalled that the low zone A accepts no passengers at the ground or reference floor and it answers no up floor calls. If the quota relay for the low zone cars is not energized, the car A runs to the upper terminal floor and is dispatched in the same manner employed for the high zone cars. During the down trip, car A answers all down calls both in the high zone and in the low zone.

If the quota relay is energized before the car A enters the high zone, the car runs high call reversal in the lower zone.

If the quota relay is energized while the car A is travelling up in the high zone, the car reverses at the next down floor call or if no down floor call exists above it, it reverses at the next floor to return directly to the low zone where it answers down floor calls.

Turning now to a more detailed description of the basic operation of the car A, it will be assumed that the car is at the ground or reference floor. Under these conditions, as the car leaves the ground floor, engagement of the contact segment 63 (Fig. 5) by the brush 64 assures energization of the zone transfer relay TR. When the car A leaves the ground or reference floor, the transfer relay TR is maintained energized by a holding circuit which extends through the front contacts TR12 of the transfer relay and the back contacts PF2 of the relay PF. As long as the transfer relay TR is energized, the car A operates on the circuits 51 and 51a.

In order to start an upward trip, the operator of car A closes his doors and operates his car switch SW (Fig. 3). The operating sequence for starting the car A is similar to that discussed for the car C.

Since the floor call contact segments b2 to b6 (Fig. 2) of the car A are disconnected when the car A is conditioned for low zone operation, car A does not answer up calls as it leaves the ground or reference floor. Consequently, the car A travels directly to the upper terminal floor and stops at the upper terminal floor in a conventional manner. Actuation of a single down floor button in the low zone does not affect the upward travel of the car A for the reason that closure of only one of the contacts of the down call storing relays 2DR, 3DR, 4DR does not cause the quota relay Q (Fig. 5) to pick up.

The car A is dispatched from the upper terminal floor in the same manner discussed with reference to the high zone cars. During ts return to the ground floor, the car A answers all down calls whether in the high zone or in the low zone. Such down floor calls result in energization of the floor call stopping relay S (Fig. 4) to stop the car at the desired floors in a manner which will be apparent from the foregoing discussion.

Quota operation.—Car A in low zone

Let it be assumed next that while the car A is in the low zone, down floor calls are registered for floors 2 and 3. These calls result in closure of the contacts 2DR2 and 3DR4 (Fig. 5) of the down call storing relays and sufficient current passes through the quota relay Q to cause this relay to pick up. The resulting closure of the contacts Q1 energizes the auxiliary quota relay QA to open contacts QA1 and close contacts QA2. Opening of the contacts QA1 introduces the resistor R7 in series with the winding of the quota relay Q in order to facilitate drop-out of the quota relay when a resistor is subsequently connected across the quota relay and the resistor R7.

Since the transfer relay is energized, the contacts TR14 are closed and if car A is at the ground floor or travelling upwardly, the contacts W9 of the up direction preference relay will be closed. If the contacts PC3 of the transfer control relay also are closed, closure of the contacts QA2 energizes the quota modifying relay QM. The quota modifying relay thereupon closes its contacts QM3 to connect the resistor R5 in parallel with the winding of the quota relay Q and the resistor R7. This drops the current through the winding of the quota relay Q sufficiently to cause the relay to drop out and open its contacts Q1. Opening of the contacts Q1 deenergizes the auxiliary quota relay AQ to close contacts QA1. Consequently, the quota relay Q will remain deenergized until more than two down floor calls are registered in the low zone.

Energization of the quota modifying relay QM also closes contacts QM4 which in cooperation with the contacts W8 of the up direction preference relay complete a holding circuit for the quota modifying relay around the contacts QA2 and W9.

It will be noted that if the car A is at the ground floor, the quota modifying relay QM is not energized until the doors are closed to close the door relay contacts DR2. However, when the car A leaves the ground floor, the switch 61 closes to maintain energization of the quota modifying relay despite subsequent opening of the doors and of the contacts DR2.

The quota modifying relay QM also closes contacts QM2 to maintain the transfer relay TR energized despite subsequent openings of the contacts PF2 of the control relay. Since the transfer relay TR is maintained energized, car A must continue to operate on the circuits 51 and 51a.

It should be noted further that energization of the quota modifying relay QM closes contacts QM5 to condition the high call reversing relay J for energization. Since the car A is assumed to be travelling in an up direction, the contacts W6 of the up direction preference relay are closed and the high call reversing relay J will be energized if the contacts H1 of the high car call relay remain closed and the contacts K1 of the high floor call relay are closed.

Since the contacts 3DR3 of the down call storing relay 3DR are open, the high floor call relay K cannot be energized at the contact segment d2 for the second floor. However, as soon as the brush 34 engages the contact segment d3 for the third floor, an energizing circuit is completed for the high floor call relay K. This circuit may be traced from the supply conductor L+5 through a conductor 71, back contacts 4DR4 of the down call storing relay for the fourth floor, the conductor 15, the contact segment d3, the brush 34, the front contacts W5 of the up direction preference relay, the winding of the high floor call relay K and the contacts TR15 to the supply conductor L—5.

When the high floor call relay K is energized, the circuit for the high call reversing relay J is completed and may be traced from the conductor L+5 through the winding of the high call reversing relay J and the contacts H1, K1, W6, and QM5 to the supply conductor L—5. A holding circuit for the relay may be traced from the supply conductor L+5 through the winding of the relay J and the contacts H1, J3, J4, DR1 and J5 to the supply conductor L—5. Therefore, the relay remains energized until the doors of the car A are closed at the third floor to open the contacts DR1. (The doors start to open before the car A reaches its stopping inductor plate. Consequently the door relay back contacts DR1 close before the contacts W6 open.)

Energization of the high call reversing relay J closes the contacts J1 to energize the inductor holding relay G, the slowdown inductor relay E and the stopping inductor relay F (Fig. 3). Such energization of the inductor relays results in the stopping of the car A at the third floor in a conventional manner.

It will be recalled that as the car stops, the car running relay M is deenergized and consequently opens its contacts M2 (Fig. 3). Since the contacts J2 of the high call reversing relay also are open, the up direction preference relay W is deenergized and closes its contacts W2 to energize the down direction preference relay X. Consequently, the car A is conditioned for a return to the ground floor. When the operator of the car closes his doors and operates the car switch SW, the car A will return to the ground floor stopping at the second floor in a conventional manner to pick up the down call at the second floor.

It will be noted that when the quota modifying relay is energized, it closes contacts QM1 which are in series with the automatic by-pass relay PB. However, since the contacts X8 which are also in series with the relay PB are open, the relay remains closed and permits the car A to stop at the third floor. When the car A reverses at the third floor, the contacts X7 of the down direction preference relay close to energize the limiting relay Z. The resulting opening of the contacts Z1 prevents energization of the by-pass relay PB and permits the car A to pick up a down call at the second floor.

When the car A reverses at the third floor, the contacts W8 of the up direction preference relay open but the holding circuit for the quota modifying relay QM remains closed through the mechanical switch 62. When the car A reaches the second floor, the switch 62 is opened by its cam 60 to deenergize the quota modifying relay QM. It should be noted that the deenergization of the quota modifying relay QM results in an opening of the contacts QM3 and again permits energization of the quota relay Q by two registered down floor calls in the lower zone.

*Quota operation.—Car A in high zone*

If at the time the car leaves the ground floor on an upward trip, a down floor call is registered only for the second floor, the quota relay Q does not pick up. Consequently, the car A can enter the high zone. Let it be assumed that immediately after the brush 34 (Fig. 5) leaves the contact segment $d5$, down floor calls are registered for the third, fifth, and sixth floors. Since two registered calls are received from the low zone, the quota relay Q picks up and successively effects the energization of the auxiliary quota relay QA and the quota modifying relay QM in the manner previously discussed. Since the car is travelling in an upward direction, closure of the contacts QM1 of the quota modifying relay cannot effect energization of the automatic by-pass relay PB (i. e., contacts X8 are open). Also, closure of the contacts QM5 conditions the high call reversing relay J for energization. When the brush 34 engages the contact segment $d6$, an energizing circuit for the high floor call relay is established which may be traced from the supply conductor L+5 through the contacts 6DR4 (which are closed because a down floor call has been registered on the sixth floor), the conductor 73, the contact segment $d6$, the brush 34, the contacts W5 of the up direction preference relay, the winding of the high floor call relay K and the contacts TR15 to the supply conductor L—5. If a down floor call also had been registered for the seventh floor, this energizing circuit still would have been established. Consequently, the car A will be conditioned to reverse at the first down floor call above the car. Closure of the contacts K1 results in energization of the high call reversing relay J and a reversal of the car A in the manner previously discussed. It will be recalled that when the operator of the car recloses his doors, the contacts DR1 of the door relay open to deenergize the high call reversing relay J. When the operator recloses the doors and closes his car switch, the car A is conditioned for movement towards the ground floor in a conventional manner. Since the car is conditioned for movement in a downward direction, the front contacts X8 of the down direction preference relay X are closed. In addition, the brush 49 is located above the uppermost contact $e4$ and the limiting relay Z consequently is deenergized. Since the contacts QM1 of the quota modifying relay are closed, the automatic by-pass relay PB is energized to open its contacts PB1 (Fig. 4). This prevents energization of the floor call stopping relay S and the car A consequently by-passes the down floor call which is registered for the fifth floor.

As the car A enters the low zone, the brush 49 (Fig. 5) engages the uppermost contact segment $e4$ to energize the limiting relay Z. The resulting opening of the back contacts Z1 of the limiting relay deenergizes the automatic by-pass relay PB to close the contacts PB1 (Fig. 4). This permits the energization of the floor call stopping relay S in a normal manner at the third and second floors to pick up the desired down floor calls in the low zone. As the car A continues its downward travel, the switch 62 is opened to deenergize the quota modifying relay QM in the manner previously discussed.

*Priority down call in low zone*

Let it be assumed that a priority call exists in the low zone. For a specific example, it is assumed that an intending passenger on the third floor actuates the down hall button for the third floor. The down call-storing relay 3DR opens its contacts 3DR5 (Fig. 6) to deenergize the time delay relay 3DT. If the call is not answered before the expiration of the time delay for the relay 3DT, the relay drops out and the call becomes a priority call. In response to such a low zone priority call, a high zone car may be assigned to give special service to the priority call and such an assignment now will be discussed.

Upon dropping out, the time delay relay 3DT closes its back contacts 3DT2, 3DT3.

Closure of the contacts 3DT2 energizes the special service relay PE. This relay closes its contacts PE1 and PE3.

In closing, contacts PE1 energize the relay CL. Such energization occurs only if the car C is conditioned to travel down (that is, the contacts CX7 must be closed), if the car C is in the high zone (that is, contacts CZ2 must be closed) if the car D has not previously responded to the energization of the control relay PE (that is, the contacts DL1 must be closed), and if the operator is not by-passing calls (that is, contacts CPA2 are closed).

The shift relay CL closes contacts CL1 to establish a holding circuit around the contacts PE1 and CZ2. The relay also opens its back contacts CL2 to prevent energization of the shift relay DL for the car D. Closure of contacts CL3 prepares the auxiliary floor call stopping relay CSX for energization through the brush $Ckb$ and the segments $Ck2$ to $Ck4$. Since these segments are effective for priority calls in the low zone, the car C on its descent picks up priority calls in the low zone.

As the car descends, it enters the low zone and energizes the limiting relay CZ. The limiting relay thereupon opens its back contacts CZ1 (Fig. 4) to prevent energization of the stopping relay CS. Opening of the contacts CZ2 has no effect on the operation because the shift relay remains energized through the contacts CL1.

Let it be assumed that the car C descends until the brush $Ckb$ engages the segment $Ck3$. The resulting energization of the stopping relay CSX closes contacts CSX1 (Fig. 3) to energize the inductor relays. The car thereupon picks up the third floor down call in a conventional manner and is restarted in a conventional manner towards the ground floor. When it reaches the ground floor, the car C is stopped and conditioned for upward travel in a conventional manner. It will be recalled that such conditioning includes the deenergization of the up direction preference relay CX (Fig. 3) and the resultant opening of the contacts CX7 (Fig. 6). Opening of the contacts CX7 deenergizes the shift relay CL to reset the high zone car C for basic operation.

Upon cancellation of the call at the third floor, the down call-storing relay 3DR recloses its contacts 3DR5 to reenergize the time delay relay 3DT. The time delay relay opens its contacts 3DT2 and 3DT3. Opening of the contacts 3DT2 deenergizes the special service relay PE. However, had another low zone priority call such as one for the second floor been awaiting service at the same time, the contacts 2DT2 would maintain the special service relay PE energized until the brush Ckb reached the segment Ck2. Thus the relay PE remains energized until the last low zone priority call is answered, and the car answers each such priority call in substantially the same manner.

When the special service relay PE is finally deenergized, it opens its contacts PE1 and PE3. However, the contacts CL1 remain closed until the car reverses at the lower terminal floor. Upon reversal of the car, the contacts CX7 open to deenergize the relay CL and complete the restoration of the car for basic service. Since the relay CL remains energized until the car reaches the terminal floor, a second high zone car cannot be assigned for special service until the first car so assigned has completed its special service run.

*Priority down call in high zone*

Let it be assumed that a priority call exists in the high zone. For a specific example, it is assumed that an intending passenger on the sixth floor actuates the down hall button for the sixth floor. The down call-storing relay 6DR opens its contacts 6DR5 to deenergize the time delay relay 6DT. If the call is not answered before the expiration of the time delay for the relay 6DT, the relay drops out and the call becomes a priority call. In response to such a call, a low zone car may be assigned to give special service to the high zone priority call and such assignment now will be discussed.

It is assumed further that at the time the call becomes a priority call, the low zone cars A and B are on up motion in the low zone and that neither of these cars has its quota filled.

Upon dropping out, the relay 6DT opens its contacts 6DT1 and closes its contacts 6DT2 and 6DT3. The contacts 6DT1 form part of a high priority-call reversing control for the up-travelling low zone cars.

Closure of the contacts 6DT2 energizes the special service control relay PF. This relay opens its contacts PF2 (Fig. 5) to deenergize the transfer relays such as TR. (This assumes that the contacts QM2 are open. Had these contacts been closed, the car A could not have been assigned for special service to the high zone.) The relay TR opens its contacts TR15 to render the high floor call relay K ineffective. Contacts TR11 close to prepare the high call reversing relay J for subsequent energization. Contacts TR12 open to prevent reenergization of the transfer relay through contacts PF2 or QM2. Contacts TR13 close to prepare the transfer control relay PC for subsequent energization. Contacts TR14 open to prevent energization of the quota modifying relay QM. A similar sequence is followed by the control system for the car B.

Referring again to Fig. 6, the deenergization of the transfer relay closes contacts TR16 to prepare the auxiliary high floor call relay KX for subsequent energization. Consequently the low zone cars operate on the high priority call circuit associated with the relay KX and BKX.

Closure of the contacts PF1 and PF3 prepare the shift relays L and BL for subsequent energization.

It will be assumed that the car A is the first low zone car to reach the sixth floor. As the cars proceed upwardly, the brush jb engages the segments j2, etc., until it reaches the first "hot" segment j6. Upon such engagement an energizing circuit is established for the auxiliary high priority-floor-call relay KX.

The relay KX closes its contacts KX1 (Fig. 5) to complete a circuit for the high call reversing relay J which may be traced as follows:

L+5, J, H1, KX1, W6, TR11, L—5

Upon energization, the relay J operates in the manner heretofore discussed to stop the car at the sixth floor and to reverse it. In answering the call, the call is cancelled, the contacts 6DR5 reclose, and the time delay relay 6DT is restored to energized condition.

The energization of the high call reversing relay closes the contacts J6 to complete an energizing circuit for the transfer control relay PC. Upon energization, the relay PC establishes a self-holding circuit through the contacts PC1 and Z2.

Contacts PC2 close to energize the auxiliary transfer control relay PD. This relay reenergizes the transfer relays TR, etc., of the low zone cars. Consequently, only one car at a time can give special service to priority calls in the high zone. Since the contacts TR16 and BTR16 of the transfer relays open before the assigned car reaches the sixth floor, the remaining low zone cars are returned as soon as convenient to basic service. Closure of the contacts PC4 maintains the energizing circuit for the relay KX despite the opening of the transfer relay contacts TR16.

In closing, contacts PC5 complete a circuit through the contacts PF1 for the shift relay L. This relay opens contacts L1 (Fig. 4) to prevent energization of the floor call stopping relay S. In addition, the contacts L2 (Fig. 6) close to establish a holding circuit for the relay L around the contacts PF1. Finally, the contacts L3 are closed by the energization of the relay L to prepare the auxiliary floor call stopping relay SX for energization. It will be understood that for down travel the contacts X9 are closed.

The contact segments k5 to k7 are connected respectively to the bus L+6 respectively through the back contacts 5DT3 to 7DT3 of the time delay relays. Consequently, the auxiliary floor call stopping relay SX is responsive only to priority down calls during the return of the elevator car to the low zone. For example, if a down floor call at the fifth floor becomes a priority call while the assigned elevator car is at the sixth floor, the contacts 5DT3 would close, and the relay SX would be energized through the segment k5 to stop the car at the fifth floor. When energized, the relay SX closes its contacts SX1 (Fig. 3) to energize the inductor relays and to stop the car in a manner which will be understood from the foregoing discussion.

As the car A continues its descent, it enters the low zone and energizes its limiting relay Z (Fig. 5). This relay opens its contacts Z1 associated with the by-pass relay PB. Also contacts Z2 open to deenergize the transfer control relay PC.

Because of its deenergization, the relay PC opens its holding contacts PC1 and opens the contacts PC2 to deenergize the control relay PD. The contacts PD1 open, but have no immediate effect on system operation. Contacts PC3 close to prepare the quota modifying relay QM for subsequent energization.

Opening of the contacts PC4 prevents energization of the auxiliary high floor call relay KX during a subsequent normal up trip. (The contacts TR16 are open at this time.)

The contacts PC5 open to deenergize the shift relay L. This relay opens its contacts L2 which are employed for holding purposes and opens its contacts L3 to remove the auxiliary floor call stopping relay from service. Also the relay L closes its contacts L1 (Fig. 4) to restore the floor call stopping relay S into service. This permits the car A to stop for all down calls in the low zone. The car now provides basic service and is subject to control by the quota relay.

*Priority call in high zone.—Car A at upper terminal floor*

It will be recalled that if a low zone car is positioned adjacent the upper terminal floor at the time a down floor call in the upper zone becomes a priority call, it is desirable to assign such low zone car to answer the priority call in preference to other low zone cars. For the purpose of discussion, it will be assumed that car A is adjacent the upper terminal floor when a down floor call at the sixth floor becomes a priority call.

Referring to Fig. 6, it will be recalled that the time delay relay 6DT drops out to close its back contacts 6DT2. The special service control relay PF thereupon opens its contacts PF2 (Fig. 5) to deenergize the transfer relays of the low zone cars. However, since the car A is at or near the upper terminal floor, the brush 66 is in engagement with the contact segment 65 or shortly engages such contact segment to energize the transfer control relay PC through the back contacts TR13.

As a result of energization of the transfer control relay PC, the contacts PC2 close to energize the auxiliary transfer control relay PD. The relay PD thereupon operates to reenergize the transfer relays of the low zone cars and to restore all of the low zone cars with the exception of the car A for basic operation subject to the control of the quota relay. Since the relay PC of the car A remains energized through its holding contacts PC1 and the contacts Z2 of the limiting relay, the contacts PC3 remain opened and car A is not subject to control by the quota relay.

Referring again to Fig. 6 the contacts PC5 also are closed and the shift relay L is energized. Such energization opens the contacts L1 (Fig. 4) to remove the floor call stopping relay S from service. The contacts L2 (Fig. 6) close to establish a holding circuit around the contacts PF1, the contacts L3 close to place the auxiliary floor car stopping relay SX in service.

Since the last mentioned relay responds only to priority calls in the upper zone, the car A picks up all priority calls in the high zone during its travel to a lower terminal floor.

As the car A re-enters the low zone, the limiting relay Z (Fig. 5) is energized and opens its back contacts Z2 to deenergize the transfer control relay PC. The transfer control relay in turn opens its contacts PC1. Contacts PC2 open to deenergize the auxiliary transfer control relay PD. Contacts PC3 close to place car A in condition for subsequent quota control. Contacts PC4 (Fig. 6) open but have no immediate effect upon the operation of the system. Contacts PC5 open to deenergize the shift relay. Such deenergization opens contacts L1 (Fig. 4) to restore the floor call stopping relay S into service and opens contacts L3 (Fig. 6) to remove the auxiliary floor call stopping relay SX from service. During its descent the low zone car A is free to answer all floor calls from the floors of the low zone.

We claim as our invention:

1. In an elevator system, a first elevator car for serving in standard operation primarily a first group of floors in a structure, call-actuated control means operable in response to a call from one of said floors for stopping said elevator car at said floor, a second elevator car for serving in standard operation primarily a second group of floors in the structure, control means for controlling the operation of said second elevator car for the floors of said second group, and auxiliary control means cooperating with said previously named control means in response to a priority down call on one of the floors of the first group for conditioning said second elevator car to serve the priority down call at said last-named floor.

2. A system as claimed in claim 1, wherein restorating means are provided for restoring the system for standard operation after the second elevator car has served the call at the last-named floor.

3. In an elevator system, a first elevator car for serving in standard operation primarily a first group of floors in a structure having a reference floor, call-actuated control means operable in response to a call from one of said floors for stopping said elevator car at the floor of said call, a plurality of second elevator cars for serving in standard operation a second group of floors in the structure, control means for controlling the operation of said second elevator cars for the floors of said second group, and auxiliary time-responsive control means cooperating with said previously named control means in response to a failure to answer within a predetermined time a down call on one of the floors of the first group for conditioning one of said second elevator cars to serve the down call at said last-named floor, said auxiliary control means including restoring means responsive to arrival substantially at the reference floor of one of said second cars which answers the last-named call for restoring the system to standard operation.

4. In an elevator system for a building having a reference floor, a first zone of floors above the reference floor and a second zone of floors above the first zone of floors, a plurality of first elevator cars for serving in standard operation primarily the first zone and the reference floor, call-actuated control means for controlling the operation of the first elevator cars between the floors of the first zone and the reference floor, said control means including call means operable from any of the floors in the first zone for stopping the first available one of the first elevator cars at any of the floors at which said call means is operated to supply transportation towards the reference floor, a plurality of second elevator cars for serving in standard operation primarily the second zone and the reference floor, control means for controlling the operation of the second elevator cars normally between the floors of the second zone and the reference floor, and auxiliary control means cooperating with the previously-named control means in response to failure to serve within a predetermined time a floor at which said call means has been operated for conditioning one of the second elevator cars in said second zone to stop at the last-named floor in order to provide transportation therefrom to the reference floor.

5. A system as claimed in claim 4, wherein said auxiliary control means includes restoring means responsive to arrival adjacent the reference floor of the one of the second elevator cars which answered the call at the last-named floor for restoring the system for standard operation.

6. In an elevator system for a structure having a reference floor, a first zone of floors and a second zone of floors above the first zone, a first elevator car, control means controlling the first elevator car under heavy traffic conditions to serve the reference floor and the floors of said first zone and to ignore the floors of the second zone, said control means including first call means operable from the floors of the first zone for stopping the first elevator car at the associated floors to provide transportation therefrom to the reference floor, and said control means including quota means responsive to operation of a predetermined number of said first call means for reversing the first elevator car at the highest down call in the first zone, a second elevator car, call-actuated control means controlling the second elevator car to serve the reference floor and the floors of the second zone, call-actuated control means including second call means operable from floors in the second zone for stopping the second elevator car at the associated floors to provide transportation in a downward direction, and auxiliary control means cooperating with the previously-mentioned control means in response to a failure to answer within a predetermined time an operated one of said second call means during light traffic conditions in the first zone for conditioning the first elevator car to proceed to, and reverse at, the highest down call in said second zone.

7. In an elevator system for a building having a reference floor, a first zone of floors above the reference floor and a second zone of floors above the first zone, a first elevator car, control means including first down-call means operable from the floors of the first zone for stopping the first elevator car at the associated floors to provide transportation therefrom to the reference floor, said control means under predetermined traffic conditions preventing entry of the first elevator car into the second zone, a second elevator car, control means controlling the second car to serve the floors of the second zone, said control means including second down-call means operable from the floors of the second zone for stopping the second elevator car at the associated floors to provide transportation therefrom to the reference floor, and auxiliary control means cooperating in the absence of said predetermined traffic conditions with the previously-mentioned control means in response to a failure to answer within a predetermined time an operated one of the second call means for conditioning the first elevator car to proceed to, and reverse at, the highest down call in the second zone which has been registered for at least said predetermined time if said predetermined traffic conditions do not exist at the time of the conditioning.

8. In an elevator system for a building having a reference floor, a first zone of floors above the reference floor and a second zone of floors above the first zone, a plurality of first elevator cars, control means including first down-call means operable from the floors of the first zone for stopping the first available one of the elevator cars at the associated floors to provide transportation therefrom to the reference floor, said control means comprising quota means responsive to operation of a predetermined number of said down-call means for reversing an upwardly-traveling one of said first elevator cars at the highest down call in the first zone, a second elevator car, control means controlling the second car to serve the floors of the second zone, said control means including second down-call means operable from the floors of the second zone for stopping the second elevator car at the associated floors to provide transportation therefrom to the reference floor, and auxiliary control means cooperating with the previously-mentioned control means in response to a failure to answer an operated one of the second call means within a predetermined time while the operated first down-call means are below said predetermined number for conditioning one of said first elevator cars to proceed to, and reverse at, the highest down call in the second zone which has been registered for at least said predetermined time regardless of the attainment of said predetermined number prior to the completion of the response of one of the first elevator cars to the highest down call, said auxiliary control means including an interlock responsive to operation of the quota means for preventing said conditioning.

9. In an elevator system for a building having a reference floor, a first zone of floors above the reference floor and a second zone of floors above the first zone, a plurality of first elevator cars, control means including first down-call means operable from the floors of the first zone for stopping one of the elevator cars at the associated floors to provide transportation therefrom to the reference floor, said control means comprising quota means responsive to operation of a predetermined number of said down-call means for reversing an upwardly-traveling one of said first elevator cars at the highest down call in the first zone, a second elevator car, control means controlling the second car to serve the floors of the second zone, said control means including second down-call means operable from the floors of the second zone for stopping the second elevator car at the associated floors to provide transportation therefrom to the reference floor, and auxiliary control means cooperating with the previously-mentioned control means in response to a failure to answer an operated one of the second call means within a predetermined time while the operated first down-call means are below said predetermined number for conditioning upwardly-traveling ones of said first elevator cars to proceed to, and reverse at, the highest down call, in the second zone which has been registered for at least said predetermined time regardless of the attainment of said predetermined number prior to the completion of the response of one of the first elevator cars to the highest down call, said auxiliary control means including an interlock responsive to operation of the quota means for preventing said conditioning, said auxiliary control means including releasing means responsive to the pickup by an upwardly-traveling one of the first elevator cars of the highest down call in the second zone which has been registered for at least said predetermined time for resetting the remainder of the upwardly-traveling first elevator cars for control by the quota means.

10. A system as claimed in claim 9, wherein the car picking up the highest down call which has been registered for at least said predetermined time in the second zone also is conditioned to pick up all down calls which have been registered for at least said predetermined time reached by the last-named car on its trip to the reference floor.

11. In an elevator system for a structure having a first zone of floors and a second zone of floors above the first zone, a plurality of first elevator cars, control means controlling the first elevator cars under heavy traffic conditions to serve the floors of said first zone and to prevent entry of the first elevator cars into the second zone, a second elevator car, call-actuated control means controlling the second elevator car to serve the floors of the second zone, said call-actuated control means including call means operable from floors in the second zone for stopping the second elevator car at the associated floors to provide transportation in a downward direction, and auxiliary control means cooperating with the previously-mentioned control means in response to a priority down call from an operated one of said call means above the first elevator cars for conditioning the first elevator cars in the absence of said heavy traffic conditions to proceed to, and reverse at, the highest priority down call in said second zone regardless of occurrence of the heavy traffic conditions subsequent to said conditioning but prior to completion of the response by the first elevator cars to the highest priority down call, said auxiliary control means comprising means responsive to the presence of one of the first elevator cars adjacent the upper end of the second zone for placing the remainder of the first elevator cars under control of the first-named control means.

12. In an elevator system for a building having a reference floor, a first zone of floors above the reference floor and a second zone of floors above the first zone, a plurality of first elevator cars, control means including first down-call means operable from the floors of the first zone for stopping one of the elevator cars at the associated floors to provide transportation therefrom to the reference floor, said control means comprising quota means responsive to operation of a predetermined number of said down-call means for reversing an upwardly-traveling one of said first elevator cars at the highest down call in the first zone, a second elevator car, control means controlling the second car to serve the floors of the second zone, said control means including second down-call means operable from the floors of the second zone for stopping the second elevator car at the associated floors to provide transportation therefrom to the reference floor, and auxiliary control means cooperating with the previously-mentioned control means in response to a priority down call from an operated one of the second call means above the first elevator cars while the operated first call means are below said predetermined number for conditioning one of said first elevator cars to proceed to, and reverse at, the highest priority down call in the second zone regardless of the attainment of said predetermined number prior to the completion of the response of one of the first elevator cars to the highest priority down call, said auxiliary control means including means responsive to the presence of one of the first elevator cars adjacent the upper end of the second zone for substantially maintaining the remainder of the first elevator cars under the control of the quota means despite said priority call from an operated one of the second call means.

13. A system as claimed in claim 1, in combination with supplemental control means, cooperating with the previously-named control means in response to a priority call on a floor of the second group for conditioning the first elevator car to answer the last-named call.

14. A system as claimed in claim 4, in combination with call means operable from any of the floors in the second zone for stopping an available one of the second elevator cars to provide transportation towards the reference floor, and supplemental control means cooperating with the previously-named control means in response to a priority down call on a floor of the second zone for conditioning one of the first elevator cars to pick up said last-named priority down call.

15. A system as claimed in claim 4, in combination with down call means operable from any of the floors in the second zone for stopping an available one of the second elevator cars to provide transportation towards the reference floor, and supplemental control means cooperating with the previously-named control means in response to a priority down call on a floor of the second zone for conditioning one of the first elevator cars to proceed to, and reverse at, the highest priority down call.

16. A system as defined in claim 8, in combination with supplemental means cooperating with the control means in response to a priority down call from a floor in the first zone for conditioning said second elevator car to pick up the priority down call, said supplemental means being responsive to said priority down call for conditioning said second elevator car only when the second elevator is approaching the first zone in a downward direction.

17. An elevator system as defined in claim 4, wherein said auxiliary control means includes interlocking mechanism preventing assignment at one time of all of the second elevator cars to serve the last-named floor.

18. An elevator system as defined in claim 7, wherein the auxiliary control means includes means effective upon reversal of the first elevator car at said highest down call for conditioning the first elevator car to answer successively each down call in the second zone during the downward travel of the first elevator car which has been registered for at least said predetermined time.

19. An elevator system as defined in claim 18 in combination with call-actuated control means including call means operable from the floors of the first zone for stopping the first elevator car at each of the floors of the first zone during said downward travel.

20. In an elevator system, a structure having a reference floor, a first zone of floors spaced from the reference floor and a second zone of floors spaced from the reference floor, a first elevator car for serving primarily the floors of the first zone and the reference floor, a second elevator car for serving primarily the floors of the second zone and the reference floor, control means including primary call circuit means effective when in operating condition for stopping the second elevator car to pick up calls from the floors of the second zone, said primary call circuit means being ineffective to stop the second elevator car for first zone calls, said control means including priority call circuit means effective when in operating condition for conditioning the second elevator car to pick up priority calls from the floors of the first zone, and priority-call-responsive means associated with the floors of the first zone for transferring the second elevator car from control by the primary call circuit means to control by the priority call circuit means.

21. A system as claimed in claim 20, in combination with means responsive to arrival of the second elevator car adjacent the reference floor for restoring the second elevator car from control by the priority call circuit means to control by the primary call circuit means.

22. A system as claimed in claim 20, wherein the priority-call-responsive means is effective for said transferring of the second elevator car only if the second elevator car is traveling in the second zone towards the reference floor.

23. In an elevator system, a structure having a reference floor, a first zone of floors spaced from the reference floor and a second zone of floors spaced from the reference floor, a first elevator car for serving primarily the floors of the first zone and the reference floor, a plurality of second elevator cars for serving primarily the floors of the second zone and the reference floor, control means including primary call circuit means effective when in operating condition for stopping the second elevator cars to pick up calls from the floors of the second zone, said primary call circuit means being ineffective to stop the second elevator cars for first zone calls, said control means including priority call circuit means effective when in operating condition for conditioning the second elevator cars to pick up priority calls from the floors of the first zone, priority-call-responsive means associated with the floors of the first zone for transferring one of the second elevator cars from control by the primary call circuit means to control by the priority call circuit means, and selective means permitting assignment of part only of the second cars for control by the priority call circuit means at one time.

24. A system as claimed in claim 23, wherein said selective means permits assignment only of a second car outside of the first zone and traveling toward the reference floor, and restoring means responsive to arrival of a second elevator car under control of the priority call circuit means adjacent the reference floor for restoring the last-named car to control by the primary call circuit means.

25. In an elevator system, a structure having a reference floor, a first zone of floors spaced from the reference floor and a second zone of floors spaced from the reference floor, a first elevator car for serving primarily the floors of the first zone and the reference floor, a second elevator car for serving primarily the floors of the second zone and the reference floor, control means including primary call circuit means effective when in operating condition for stopping the first elevator car to pick up calls from the floors of the first zone, said primary call circuit means being ineffective to stop the first elevator car for second zone calls under predetermined traffic conditions, said control means including priority call circuit means effective when in operating condition for conditioning the first elevator car to pick up priority calls from the floors of the second zone under said predetermined traffic conditions, and priority-call-responsive means associated with the floors of the second zone for transferring the first elevator car from control by the primary call circuit means to control by the priority call circuit means only if the predetermined traffic conditions do not exist at the time of such transferring.

26. A system as claimed in claim 25, in combination with restoring means responsive to entry of the first elevator car into the first zone as it travels towards the reference floor under control of the priority call circuit means for restoring the first elevator car to control by the primary call circuit means.

27. A system as claimed in claim 25, wherein the priority call circuit means includes means effective for reversing a first zone elevator car traveling away from the reference floor under the control of the priority call circuit means at the priority call farthest from the reference floor.

28. A system as claimed in claim 27, wherein said priority call circuit means includes means assigning the first zone elevator car after such reversal to pick up successively all priority calls in the second zone encountered during the return of the first elevator car towards the reference floor.

29. A system as claimed in claim 28, in combination with restoring means responsive to reentry of the first elevator car into the first zone while operating subject to the priority call circuit means for restoring the elevator car for control by the primary call circuit means.

30. In an elevator system, a structure having a reference floor, a first zone of floors spaced from the reference floor and a second zone of floors spaced from the reference floor, a plurality of first elevator cars for serving primarily the floors of the first zone and the reference floor, a second elevator car for serving primarily the floors of the second zone and the reference floor, control means including primary call circuit means effective when in operating condition for stopping the first elevator cars to pick up calls from the floors of the first zone, said primary call circuit means being ineffective to stop the first elevator cars for second zone calls under predetermined traffic conditions, said control means including priority call circuit means effective when in operating condition for conditioning the first elevator cars to pick up priority calls from the floors of the second zone, and priority-call-responsive means associated with the floors of the second zone for transferring the first elevator cars from control by the primary call circuit means to control by the priority call circuit means only if the predetermined traffic conditions do not exist at the time of such transferring.

31. A system as claimed in claim 30, in combination with means responsive to acceptance of a priority call in the second zone by one of the first elevator cars for subjecting the remainder of the first elevator cars to full control by the primary call circuit means.

32. A system as claimed in claim 31, in combination with restoring means responsive to reentry of a first elevator car into the first zone after it has accepted a second zone priority call for restoring the last-named elevator car to control by the primary call circuit means.

33. A system as claimed in claim 31, in combination with preference means responsive to the presence of one of the first elevator cars adjacent a predetermined floor substantially spaced from the reference floor and from the first zone for assigning the last-named elevator car to accept a priority call in the second zone.

34. A system as claimed in claim 31, wherein the control means includes remote call means responsive to said acceptance for reversing the accepting first elevator car at the priority call most remote from the reference floor and conditioning the accepting first elevator car to pick up all priority calls encountered during its return to the reference floor.

35. A system as claimed in claim 3, in combination with means permitting said conditioning only if the second car is in a position for making a complete trip through the first zone.

36. A system as claimed in claim 4, in combination with means permitting said conditioning of one of the second elevator cars only if the second elevator car to be conditioned is above the first zone of floors.

37. In an elevator system for a building having a reference floor, a first zone of floors above the reference floor and a second zone of floors above the first zone, a plurality of first elevator cars, control means including first down-call means operable from the floors of the first zone for stopping one of the elevator cars at the associated floors to provide transportation therefrom to the reference floor, said control means comprising quota means responsive to operation of a predetermined number of said down-call means for reversing an upwardly-traveling one of said first elevator cars at the highest down call in the first zone, a plurality of second elevator cars, control means controlling the second cars to serve the floors of the second zone, said control means including second down-call means operable from the floors of the second zone for stopping the second elevator cars at the associated floors to provide transportation therefrom to the reference floor, auxiliary control means cooperating with the previously-mentioned control means in response to a failure to answer an operated one of the second call means within a predetermined time while the operated first down-call means are below said predetermined number for conditioning upwardly-traveling ones of said first elevator cars to proceed to, and reverse at, the highest down call in the second zone which has been registered for at least said predetermined time regardless of the attainment of said predetermined number prior to the completion of the response of one of the first elevator cars to the highest down call, said auxiliary control means including an interlock responsive to operation of the quota means for preventing said conditioning, said auxiliary control means including releasing means responsive to the pickup by an upwardly-traveling one of the first elevator cars of the highest down call in the second zone which has been registered for at least said predetermined time for resetting the remainder of the upwardly-traveling first elevator cars for control by the quota means, and supplemental means cooperating with the control means in response to a priority down call in the first zone for conditioning any of the second elevator cars to pick up the priority down call, said supplemental means being responsive to said priority down call for conditioning only second elevator cars in the second zone and controlled for operation in a down direction to pick up the priority down call, and said supplemental means including means responsive to arrival adjacent the reference floor of the first of the second elevator cars which was conditioned to pick up the priority down call in the first zone for terminating the conditioning of said second elevator cars.

DANILO SANTINI.
ARVID M. NELSON.
JOHN SUOZZO.

No references cited.